US011863949B2

(12) United States Patent
Alexander

(10) Patent No.: US 11,863,949 B2
(45) Date of Patent: Jan. 2, 2024

(54) DIRECTIONAL SOUND RECORDING AND PLAYBACK

(71) Applicant: Eric Jay Alexander, Orem, UT (US)

(72) Inventor: Eric Jay Alexander, Orem, UT (US)

( * ) Notice: Subject to any disclaimer, the term of this patent is extended or adjusted under 35 U.S.C. 154(b) by 0 days.

(21) Appl. No.: 17/724,420

(22) Filed: Apr. 19, 2022

(65) Prior Publication Data

US 2022/0240011 A1 Jul. 28, 2022

Related U.S. Application Data

(63) Continuation of application No. 16/267,143, filed on Feb. 4, 2019, now Pat. No. 11,310,597.

(51) Int. Cl.

| | |
|---|---|
| ***H04R 3/04*** | (2006.01) |
| ***H04S 7/00*** | (2006.01) |
| ***H04R 5/04*** | (2006.01) |
| ***H04R 5/027*** | (2006.01) |
| ***H04R 5/033*** | (2006.01) |
| ***H04S 3/00*** | (2006.01) |

(52) U.S. Cl.
CPC ............... *H04R 3/04* (2013.01); *H04R 5/027* (2013.01); *H04R 5/033* (2013.01); *H04R 5/04* (2013.01); *H04S 3/004* (2013.01); *H04S 7/307* (2013.01); *H04R 2420/07* (2013.01)

(58) Field of Classification Search
CPC .......... H04R 3/04; H04R 5/027; H04R 5/033; H04R 5/04; H04R 2420/07; H04S 3/004; H04S 7/307
See application file for complete search history.

(56) References Cited

U.S. PATENT DOCUMENTS

2005/0089181 A1* 4/2005 Polk ........................ H04S 3/002 381/27
2013/0177159 A1* 7/2013 Lee .......................... H04R 5/04 381/17

* cited by examiner

*Primary Examiner* — Andrew L Sniezek
(74) *Attorney, Agent, or Firm* — Bryant J. Keller; Kirton McConkie

(57) ABSTRACT

Systems and methods for providing improved localization of recorded and played back sound are provided by improved microphone arrays for recording sound and by improved systems for playback of sound. Microphone arrays include four microphones with sound transducers located and aimed to mimic capture of sound by human ears. Sound captured by two side-viewing microphones is attenuated, at the time of sound capture and/or recording, at a later processing stage, or at the time of sound playback, by low-pass filtering. The recording maintains four separate channels of sound. Playback occurs through four speakers arranged to reproduce sound in the way human ears hear sound, with appropriate attenuation for side speakers. Playback can also occur through four-channel headphones. Improved playback of two-channel stereo sound can also occur through low-pass filtering of each track and playing the filtered sound through side/rear speakers on the opposite sides.

13 Claims, 19 Drawing Sheets

DIRECTIONAL SOUND RECORDING AND PLAYBACK

BACKGROUND OF THE INVENTION

1. Field of the Invention

The present invention relates to sound recording and playback, and more particularly to improved directionality of recording and playing back sound.

2. Background and Related Art

In the field of sound reproduction, especially high-fidelity sound reproduction, it has been a longstanding goal to reproduce sound as accurately as possible. Indeed, many thousands of dollars can be spent on audio recording and playback equipment in an attempt to accurately recreate sound. One goal in particular in recording and reproducing sound is to accurately stage sound to more-closely mimic the original listener experience when sound is being reproduced.

Unfortunately, even the best efforts to record and reproduce sound have failed to accurately permit a later listener to have a similar experience to a live sound consumption experience. A significant portion, estimated to be approximately 35%, of the sounds that the human ear is able to discern from a live musical event are not recorded and is therefore missing from original stereo recordings. Because of this, even theoretically perfect audio reproduction equipment cannot adequately recreate an original listening experience.

As a result of inadequacies in original stereo recording, the stereo sound field as perceived by the listener is flipped and perceived as being on a concave surface extending between the stereo playback speakers. The effect of such traditional stereo recording and playback is depicted in FIGS. 1 and 2. In FIG. 1, a listener 10 is experiencing a live concert performed by a band on a stage 12. The band includes a first lead singer 14 and a second lead singer 16 who are located generally toward the front of the stage 12 and are more or less centrally located. The band also includes a guitarist 18 playing at the back left of the stage 12, a bassist 20 playing at the back right of the stage 12, and a drummer 22 playing at the back center of the stage 12. Based on the auditory information received by the listener 10, the listener is able to localize where each band member is located, even with his or her eyes closed, as the auditory information received by the listener is sufficient to provide both direction and depth information.

When a traditional stereo recording of the band is made using microphones at the same position at the listener 10 and then played back through speakers, the situation may be represented by FIG. 2. In this case, the listener 10 is located at an ideal listening position to listen to a recording played by a left loudspeaker 30 and a right loudspeaker 32, but instead of experiencing the recorded sound with depth information placing the band members at their proper place on the stage, only the directionality information is preserved. Instead, the listener 10 perceives the band as if they were all on a phantom concave sound surface 34 extending between the left loudspeaker 30 and the right loudspeaker 32. Accordingly, instead of experiencing the first lead singer 14 and the second lead singer 16 as if they were at the front of the stage, the listener 10 perceives them as actually being effectively behind the guitarist 18 and the bassist 20. Additionally, the listener perceives the drummer 22 as being equally distant and centrally located, which may overemphasize the drum portion of the performance to the listener 10.

In effect, traditional sound recording and playback methods fail to accurately recreate an original listening experience that would occur in a live venue. Sounds coming from the phantom center (the center of the concave sound surface 34 created by the stereo loudspeakers 30, 32) contain latency and singers or lead musicians often sound like they are positioned behind or deeper in the sound field than the musicians positioned in the left and right of the sound field. This effect is most obvious and easily observed when a recording of a group of musicians containing a generally centrally positioned lead singer is played through a stereo sound system. A keen focus on musician placement and location in a spatial sound field effectively places the lead singer deeper in the soundstage than the rest of the band and musicians.

These problems are primary reasons why the human ear can instantly discern live music from a stereo recording. Traditional surround sound systems do not adequately address these problems. Generally, surround sound systems rely on processing of original recorded sound to attempt to mimic sound localization outside of the concave sound surface 34 extending between two loudspeakers 30, 32, but such systems do not address the problems discussed above, wherein the original sound locality information is lost at the point of the original recording.

Accordingly, deficiencies in sound recording and playback still exist and remain unaddressed.

BRIEF SUMMARY OF THE INVENTION

Implementation of the invention provides systems and methods for recording and playing back sound in ways that capture, maintain, and permit reproduction of the original listening experience. Accordingly, systems and methods are provided that record sound in a manner more similar to the way in which sound is originally experienced by the human listener. Then, systems and methods are provided to maintain the recorded sound such that the original listening experience is not lost but can be reproduced. Finally, systems and methods are provided that permit reproduction of recorded sound with preservation of the original listening experience.

According to further implementations of the invention, systems and methods are also provided that permit an enhanced reproduction of recorded sound even when the recorded sound was recorded using traditional methods. Such systems and methods may reduce or eliminate the perception of recorded sound emanating entirely from a concave sound surface 34 as depicted in FIG. 2. Systems and methods in accordance with such implementations utilize four loudspeakers to create a simulated sound field having depth lacking in traditional playback methods but using traditionally recorded stereo sound sources.

According to further implementations of the invention, systems and methods are provided that permit enhanced reproduction of recorded sound through headphones. The headphones include main and rear speakers on each side of the headphones to provide enhanced depth to a listener using the headphones. The headphones may be used with recordings that have been recorded in a way to preserve audio information as well as with recordings where sound field depth is instead simulated in accordance with implementations of the invention.

Certain implementations of the invention provide an audio system for enhanced listener localization of played-back sound. The system includes an audio source adapted to play back an audio recording having left and right audio recorded channels, a right main loudspeaker connected to the audio source and adapted to transduce sound corresponding to the right audio recorded channel, and a left main loudspeaker connected to the audio source and adapted to transduce sound corresponding to the left audio recorded channel. The system also includes a right side localization loudspeaker connected to the audio source and adapted to transduce sound corresponding to the left audio recorded channel after the left audio recorded channel is passed through a low-pass filter and a left side localization loudspeaker connected to the audio source and adapted to transduce sound corresponding to the right audio recorded channel after the right audio recorded channel is passed through a low-pass filter.

In some implementations, the low-pass filters comprise filters having a cutoff frequency of between approximately 2.0 kHz and approximately 2.5 kHz and decrease power above the cutoff frequency at approximately 6 dB per octave. In some implementations, the low-pass filters are located on a physical electrical connection between the audio source and the right side localization loudspeaker and on a physical electrical connection between the audio source and the left side localization loudspeaker. In some implementations, the low-pass filters are contained within the right side localization loudspeaker and the left side localization loudspeaker. In some implementations, the low-pass filters are contained within the audio source.

In some implementations, at least one of the loudspeakers is connected to the audio source by a wired connection. In some implementations, at least one of the loudspeakers is connected to the audio source by a wireless connection.

Some implementations of the invention provide an audio system for enhanced listener localization of played-back sound. The system includes an audio recording having four channels including a left main audio recorded channel, a right main audio recorded channel, a left side localization audio recorded channel and a right side localization audio recorded channel. The system also includes an audio source adapted to play back the audio recording comprising four channels, a right main loudspeaker connected to the audio source and adapted to transduce sound corresponding to the right main audio recorded channel, a left main loudspeaker connected to the audio source and adapted to transduce sound corresponding to the left main audio recorded channel, a right side localization loudspeaker connected to the audio source and adapted to transduce sound corresponding to the right side localization audio recorded channel, and a left side localization loudspeaker connected to the audio source and adapted to transduce sound corresponding to the left side localization audio recorded channel. The sound transduced by the right side localization loudspeaker and the left side localization loudspeaker is low-pass filtered to enhance localization by a listener.

In some implementations, low-pass filtering of the sound transduced by the right side localization loudspeaker and the left side localization loudspeaker is previously applied to the audio recording and stored in the left side localization audio recorded channel and the right side localization audio recorded channel. In other implementations, low-pass filtering of the sound transduced by the right side localization loudspeaker and the left side localization loudspeaker is applied at a time of recording the audio recording. In alternate implementations, low-pass filtering of the sound transduced by the right side localization loudspeaker and the left side localization loudspeaker is applied subsequent to a time of recording the audio recording. In still other implementations, low-pass filtering of the sound transduced by the right side localization loudspeaker and the left side localization loudspeaker is applied by the audio source to the left side localization audio recorded channel and the right side localization audio recorded channel before the audio source drives the right side localization loudspeaker and the left side localization loudspeaker. In further implementations, low-pass filtering of the sound transduced by the right side localization loudspeaker and the left side localization loudspeaker is applied by low-pass filters disposed in connections between the audio source and the right side localization loudspeaker and between the audio source and the left side localization loudspeaker. In still further implementations, low-pass filtering of the sound transduced by the right side localization loudspeaker and the left side localization loudspeaker is applied by low-pass filters disposed within the right side localization loudspeaker and the left side localization loudspeaker.

In some implementations, connections between the audio source and the loudspeakers include either wired connections or wireless connections or a combination thereof.

Further implementations of the invention provide a headphone for playback of recorded sound with enhanced perception of sound localization by a wearer of the headphone. The headphone includes a right ear cup having a right main speaker located in a forward area of the right ear cup and a right rear speaker located in a rearward area of the right ear cup and a left ear cup having a left main speaker located in a forward area of the left ear cup and a left rear speaker located in a rearward area of the left ear cup.

In some implementations, the headphone is either an on-ear headphone or an over-the-ear headphone. In some implementations, the headphone is adapted to receive a two-channel audio input having a left channel and a right channel, and to pass the right channel to the right main speaker, the left channel to the left main speaker, the right channel to the left rear speaker after passing the right channel through a first low-pass filter, and the left channel to the right rear speaker after passing the left channel through a second low-pass filter. In some implementations, the first and second low-pass filters are first-order filters having a cutoff frequency of between approximately 2.0 kHz and approximately 2.5 kHz. In some implementations, the headphone is also adapted to receive a four-channel audio input, with each of four channels of the four-channel audio input being passed to a separate of the right main speaker, the right rear speaker, the left main speaker, and the left rear speaker. In some implementations, the four-channel audio input being directed to the right rear speaker and the left rear speaker are first attenuated by a low-pass filter.

In some implementations, the headphone is adapted to receive a four-channel audio input, with each of four channels of the four-channel audio input being passed to a separate of the right main speaker, the right rear speaker, the left main speaker, and the left rear speaker.

Alternate implementations of the invention provide a system for recording audio while maintaining improved localization information of sound sources being recorded. The system includes an array of four microphones, the array having an axis of symmetry comprising a forward direction and a backward direction. The array includes a right primary microphone having a right primary sound transducer located approximately half a width of a human head to the right of the axis of symmetry and aimed toward the front right to approximate capture of sounds by a right human ear and a left primary microphone having a left primary sound transducer located approximately half the width of the human head to the left of the axis of symmetry and aimed toward the front left to approximate capture of sounds by a left human ear. The array also includes a right side-viewing microphone having a right side-viewing sound transducer located proximate the right primary sound transducer to approximate capture of sounds by the right human ear after having passed around the human head and a left side-viewing microphone having a left side-viewing sound transducer located proximate the left primary sound transducer to approximate capture of sounds by the left human ear after having passed around the human head.

In some implementations, the system further includes a four-channel recorder operatively connected to the four microphones of the array, the four-channel recorder being configured to separately record and maintain separate four channels of audio from the four microphones of the array. In some implementations, low-pass filtering is applied to the channels of audio from the right side-viewing microphone and the left side-viewing microphone. In some implementations, the low-pass filtering is applied to the channels of audio from the right side-viewing microphone and the left side-viewing microphone using a feature such as a physical structure affixed to each of the right side-viewing microphone and the left side-viewing microphone to attenuate high-frequency sound reaching the right side-viewing microphone and the left side-viewing microphone, low-pass filters applied between outputs of each of the right side-viewing microphone and the left side-viewing microphone and the four-channel recorder, low-pass filters applied by the four-channel recorder after reception of outputs of the right side-viewing microphone and the left side-viewing microphone, or low-pass filtering applied to recorded audio from the right side-viewing microphone and the left side-viewing microphone after initial recording by the four-channel recorder.

In some implementations, the right primary microphone and the left primary microphone are cardioid microphones and the right side-viewing microphone and the left side-viewing microphone are omnidirectional microphones. In some implementations, the sound transducers of the right side-viewing microphone and the left side-viewing microphone are directed approximately orthogonally to the axis of symmetry of the array. In some implementations, the array of four microphones comprises a structure such as four individual microphones or a housing encompassing the sound transducers of at least two of the microphones of the array.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
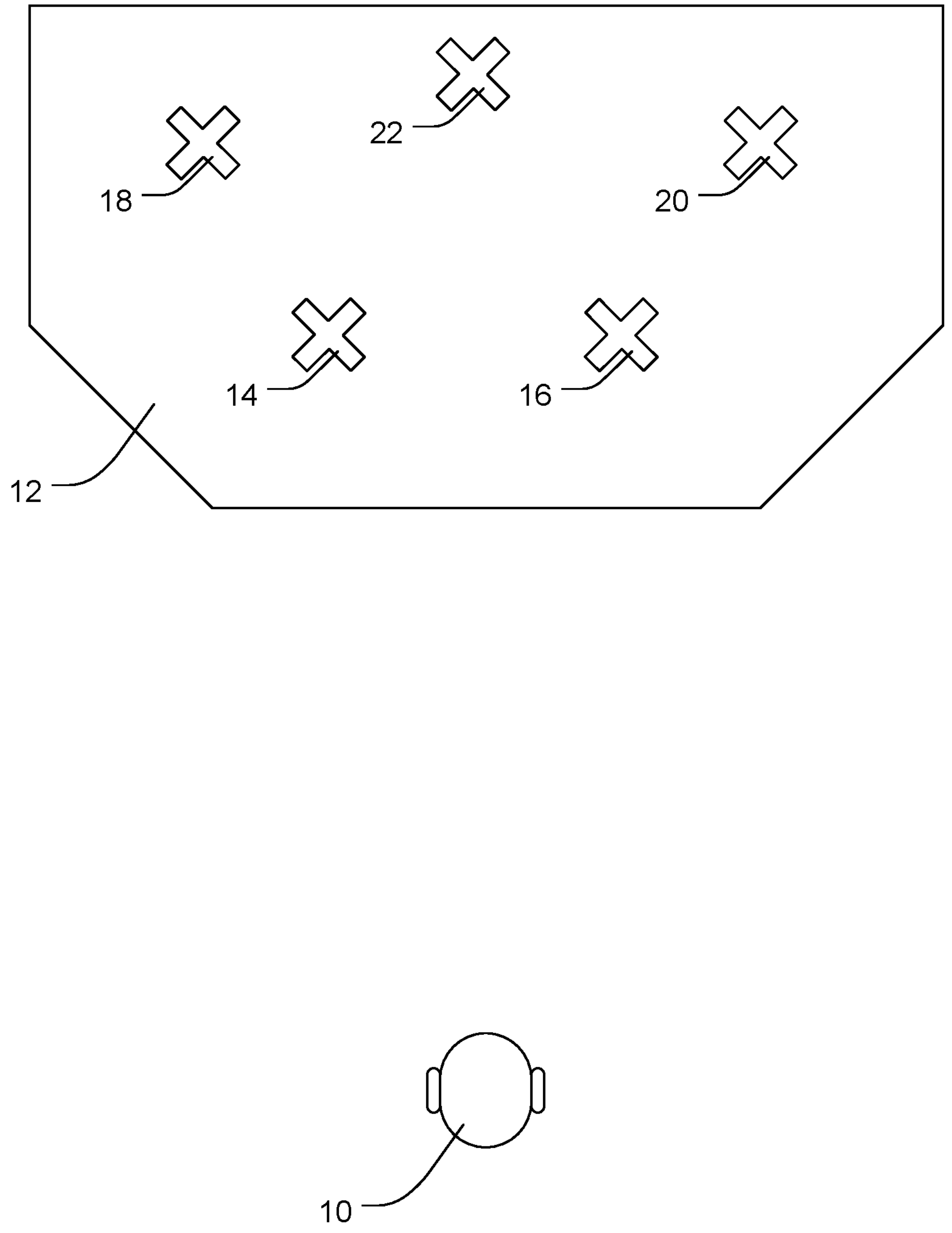
FIG. 1 (Prior Art)
FIG. 1 shows a representative typical live listener experience.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Certain embodiments of the invention provide an audio system for enhanced listener localization of played-back sound. The system includes an audio source adapted to play back an audio recording having left and right audio recorded channels, a right main loudspeaker connected to the audio source and adapted to transduce sound corresponding to the right audio recorded channel, and a left main loudspeaker connected to the audio source and adapted to transduce sound corresponding to the left audio recorded channel. The system also includes a right side localization loudspeaker connected to the audio source and adapted to transduce sound corresponding to the left audio recorded channel after the left audio recorded channel is passed through a low-pass filter and a left side localization loudspeaker connected to the audio source and adapted to transduce sound corresponding to the right audio recorded channel after the right audio recorded channel is passed through a low-pass filter.

In some embodiments, the low-pass filters comprise filters having a cutoff frequency of between approximately 2.0 kHz and approximately 2.5 kHz and decrease power above the cutoff frequency at approximately 6 dB per octave. In some embodiments, the low-pass filters are located on a physical electrical connection between the audio source and the right side localization loudspeaker and on a physical electrical connection between the audio source and the left side localization loudspeaker. In some embodiments, the low-pass filters are contained within the right side localization loudspeaker and the left side localization loudspeaker. In some embodiments, the low-pass filters are contained within the audio source.

In some embodiments, at least one of the loudspeakers is connected to the audio source by a wired connection. In some embodiments, at least one of the loudspeakers is connected to the audio source by a wireless connection.

Some embodiments of the invention provide an audio system for enhanced listener localization of played-back sound. The system includes an audio recording having four channels including a left main audio recorded channel, a right main audio recorded channel, a left side localization audio recorded channel and a right side localization audio recorded channel. The system also includes an audio source adapted to play back the audio recording comprising four channels, a right main loudspeaker connected to the audio source and adapted to transduce sound corresponding to the right main audio recorded channel, a left main loudspeaker connected to the audio source and adapted to transduce sound corresponding to the left main audio recorded channel, a right side localization loudspeaker connected to the audio source and adapted to transduce sound corresponding to the right side localization audio recorded channel, and a left side localization loudspeaker connected to the audio source and adapted to transduce sound corresponding to the left side localization audio recorded channel. The sound transduced by the right side localization loudspeaker and the left side localization loudspeaker is low-pass filtered to enhance localization by a listener.

In some embodiments, low-pass filtering of the sound transduced by the right side localization loudspeaker and the left side localization loudspeaker is previously applied to the audio recording and stored in the left side localization audio recorded channel and the right side localization audio recorded channel. In other embodiments, low-pass filtering of the sound transduced by the right side localization loudspeaker and the left side localization loudspeaker is applied at a time of recording the audio recording. In alternate embodiments, low-pass filtering of the sound transduced by the right side localization loudspeaker and the left side localization loudspeaker is applied subsequent to a time of recording the audio recording. In still other embodiments, low-pass filtering of the sound transduced by the right side localization loudspeaker and the left side localization loudspeaker is applied by the audio source to the left side localization audio recorded channel and the right side localization audio recorded channel before the audio source drives the right side localization loudspeaker and the left side localization loudspeaker. In further embodiments, low-pass filtering of the sound transduced by the right side localization loudspeaker and the left side localization loudspeaker is applied by low-pass filters disposed in connections between the audio source and the right side localization loudspeaker and between the audio source and the left side localization loudspeaker. In still further embodiments, low-pass filtering of the sound transduced by the right side localization loudspeaker and the left side localization loudspeaker is applied by low-pass filters disposed within the right side localization loudspeaker and the left side localization loudspeaker.

In some embodiments, connections between the audio source and the loudspeakers include either wired connections or wireless connections or a combination thereof.

Further embodiments of the invention provide a headphone for playback of recorded sound with enhanced perception of sound localization by a wearer of the headphone. The headphone includes a right ear cup having a right main speaker located in a forward area of the right ear cup and a right rear speaker located in a rearward area of the right ear cup and a left ear cup having a left main speaker located in a forward area of the left ear cup and a left rear speaker located in a rearward area of the left ear cup.

In some embodiments, the headphone is either an on-ear headphone or an over-the-ear headphone. In some embodiments, the headphone is adapted to receive a two-channel audio input having a left channel and a right channel, and to pass the right channel to the right main speaker, the left channel to the left main speaker, the right channel to the left rear speaker after passing the right channel through a first low-pass filter, and the left channel to the right rear speaker after passing the left channel through a second low-pass filter. In some embodiments, the first and second low-pass filters are first-order filters having a cutoff frequency of between approximately 2.0 kHz and approximately 2.5 kHz. In some embodiments, the headphone is also adapted to receive a four-channel audio input, with each of four channels of the four-channel audio input being passed to a separate of the right main speaker, the right rear speaker, the left main speaker, and the left rear speaker. In some embodiments, the four-channel audio input being directed to the right rear speaker and the left rear speaker are first attenuated by a low-pass filter.

In some embodiments, the headphone is adapted to receive a four-channel audio input, with each of four channels of the four-channel audio input being passed to a separate of the right main speaker, the right rear speaker, the left main speaker, and the left rear speaker.

Alternate embodiments of the invention provide a system for recording audio while maintaining improved localization information of sound sources being recorded. The system includes an array of four microphones, the array having an axis of symmetry comprising a forward direction and a backward direction. The array includes a right primary microphone having a right primary sound transducer located approximately half a width of a human head to the right of the axis of symmetry and aimed toward the front right to approximate capture of sounds by a right human ear and a left primary microphone having a left primary sound transducer located approximately half the width of the human head to the left of the axis of symmetry and aimed toward the front left to approximate capture of sounds by a left human ear. The array also includes a right side-viewing microphone having a right side-viewing sound transducer located proximate the right primary sound transducer to approximate capture of sounds by the right human ear after having passed around the human head and a left side-viewing microphone having a left side-viewing sound transducer located proximate the left primary sound transducer to approximate capture of sounds by the left human ear after having passed around the human head.

In some embodiments, the system further includes a four-channel recorder operatively connected to the four microphones of the array, the four-channel recorder being configured to separately record and maintain separate four channels of audio from the four microphones of the array. In some embodiments, low-pass filtering is applied to the channels of audio from the right side-viewing microphone and the left side-viewing microphone. In some embodiments, the low-pass filtering is applied to the channels of audio from the right side-viewing microphone and the left side-viewing microphone using a feature such as a physical structure affixed to each of the right side-viewing microphone and the left side-viewing microphone to attenuate high-frequency sound reaching the right side-viewing microphone and the left side-viewing microphone, low-pass filters applied between outputs of each of the right side-viewing microphone and the left side-viewing microphone and the four-channel recorder, low-pass filters applied by the four-channel recorder after reception of outputs of the right side-viewing microphone and the left side-viewing microphone, or low-pass filtering applied to recorded audio from the right side-viewing microphone and the left side-viewing microphone after initial recording by the four-channel recorder.

In some embodiments, the right primary microphone and the left primary microphone are cardioid microphones and the right side-viewing microphone and the left side-viewing microphone are omnidirectional microphones. In some embodiments, the sound transducers of the right side-viewing microphone and the left side-viewing microphone are directed approximately orthogonally to the axis of symmetry of the array. In some embodiments, the array of four microphones comprises a structure such as four individual microphones or a housing encompassing the sound transducers of at least two of the microphones of the array.

According to embodiments of the invention, sound engineers should record sound the way the human ear and brain truly discern sound. For example, if an observer obscures his right ear and then creates a snapping sound to the right side of his head, the left ear and its brain connection is still able to properly localize the location of the snap as coming from the right side of the observer's head. This localization is easily discerned. Additionally, it may be observed that high-frequency sounds are attenuated because the sound originates on the other side of the head and the head is blocking shorter wavelengths of sound. Traditional sound recording methods do not properly account for these localization effects, accounting for the approximately 35% of missing content from today's traditional stereo recordings.

Embodiments of the invention provide four-channel systems for playback of sound that provide for listener localization by producing sounds from side localization speakers that account for the attenuated sounds that normally arrive at the human ear during a live listening experience. The playback occurs, in some embodiments, using four-channel recordings that have been made in accordance with embodiments of the invention to preserve the original localization sound information. In other embodiments, the playback occurs using traditional stereo recordings in which a simulated localization signal is sent to the side localization speakers.

Where four channels of playback are used, the sound system includes four loudspeakers and four discrete channels of amplification. Additionally, in some embodiments, the sound system optionally includes proper attenuation and/or equalization of the channels to reproduce the sounds as observed by localization of sounds coming from the opposite side of the listener's head (e.g., with low-pass filtering/attenuation to the localization loudspeakers). Optionally, in some embodiments, the attenuation and/or equalization of the channels is pre-encoded in the recorded channels (e.g. on the media storing the audio recording), avoiding any need for playback attenuation/equalization. The use of separate channels for the localization loudspeakers provides for the highest fidelity to the original listening experience. The channels of amplification, attenuation, and/or equalization of the channels can be performed by an appropriately configured (four-channel) audio source.

Figure 3:
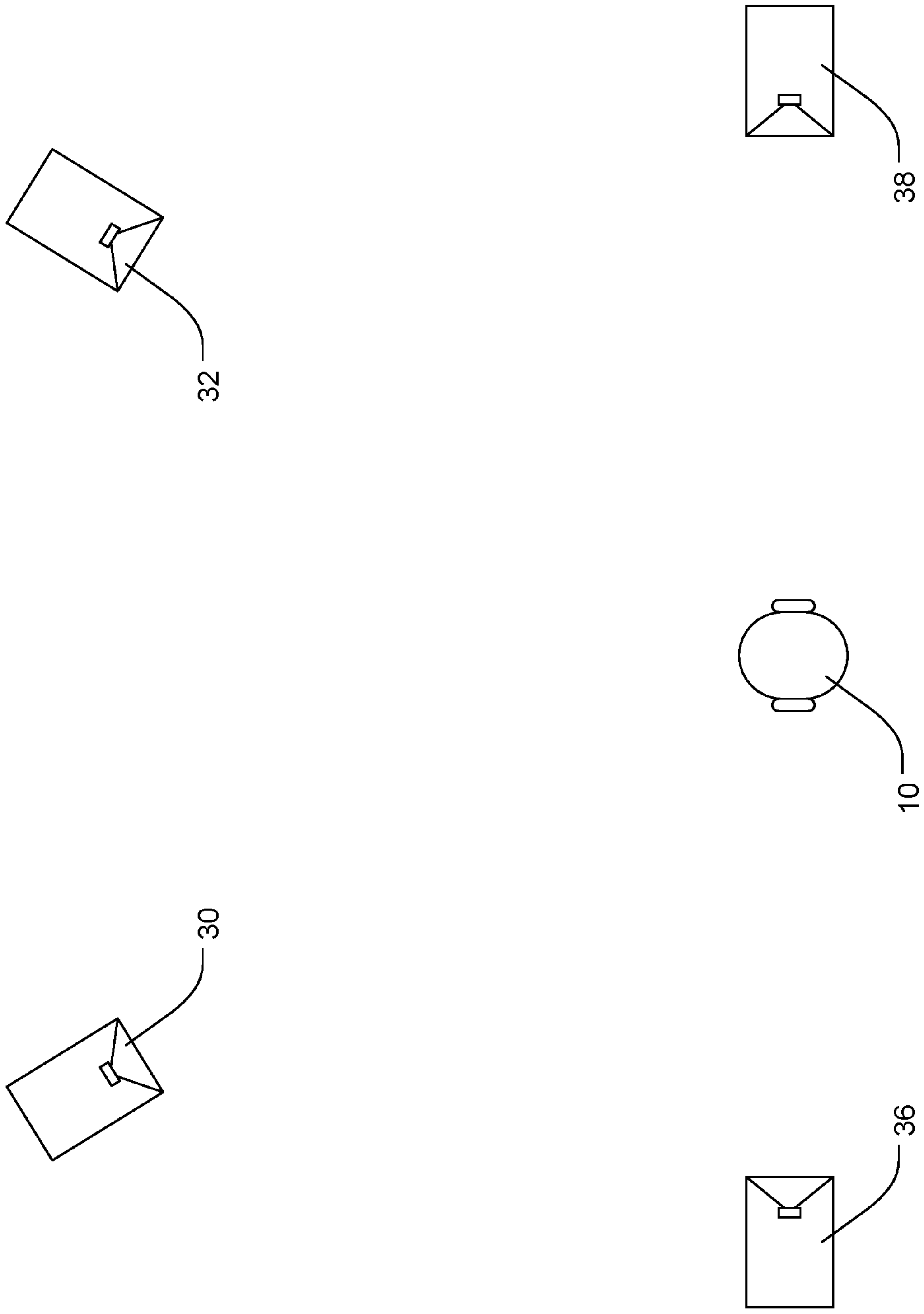
FIG. 3 shows an embodiment of an improved sound playback system.

Therefore, FIG. 3 represents a listening system in accordance with certain embodiments of the invention. In this system, the listener 10 is located at a listening position in a four-channel loudspeaker environment. In the listening environment, the left loudspeaker 30 and the right loudspeaker 30 are present, but in addition a left localization loudspeaker 36 and a right localization loudspeaker 38 are also present. In the environment of FIG. 3, when four-channel source recordings are available, the appropriate channels are sent to each of the left loudspeaker 30, the right loudspeaker 32, the left localization loudspeaker 36, and the right localization loudspeaker 38, with appropriate amplification or attenuation so as to create the appropriate listening experience best reproducing the original listening experience (see, e.g., the original listening experience of FIG. 1).

The system of FIG. 3 also includes an audio source (not shown) that is connected to the left loudspeaker 30, the right loudspeaker 32, the left localization loudspeaker 36 and the right localization loudspeaker 38. In some embodiments, the connection between the loudspeakers and the audio source is a wired connection, whereby the loudspeakers may be driven by amplification circuits contained in the audio source or one of its components. In other embodiments, the connection between at least one of the loudspeakers and the audio source is a wireless connection. In embodiments encompassing a wireless connection between the audio source and one or more loudspeakers, the respective loudspeaker or loudspeakers includes a power supply such as a battery or a wired connection to an external power source such as traditional AC (line) power, a DC power supply, or an external battery.

Figure 2:
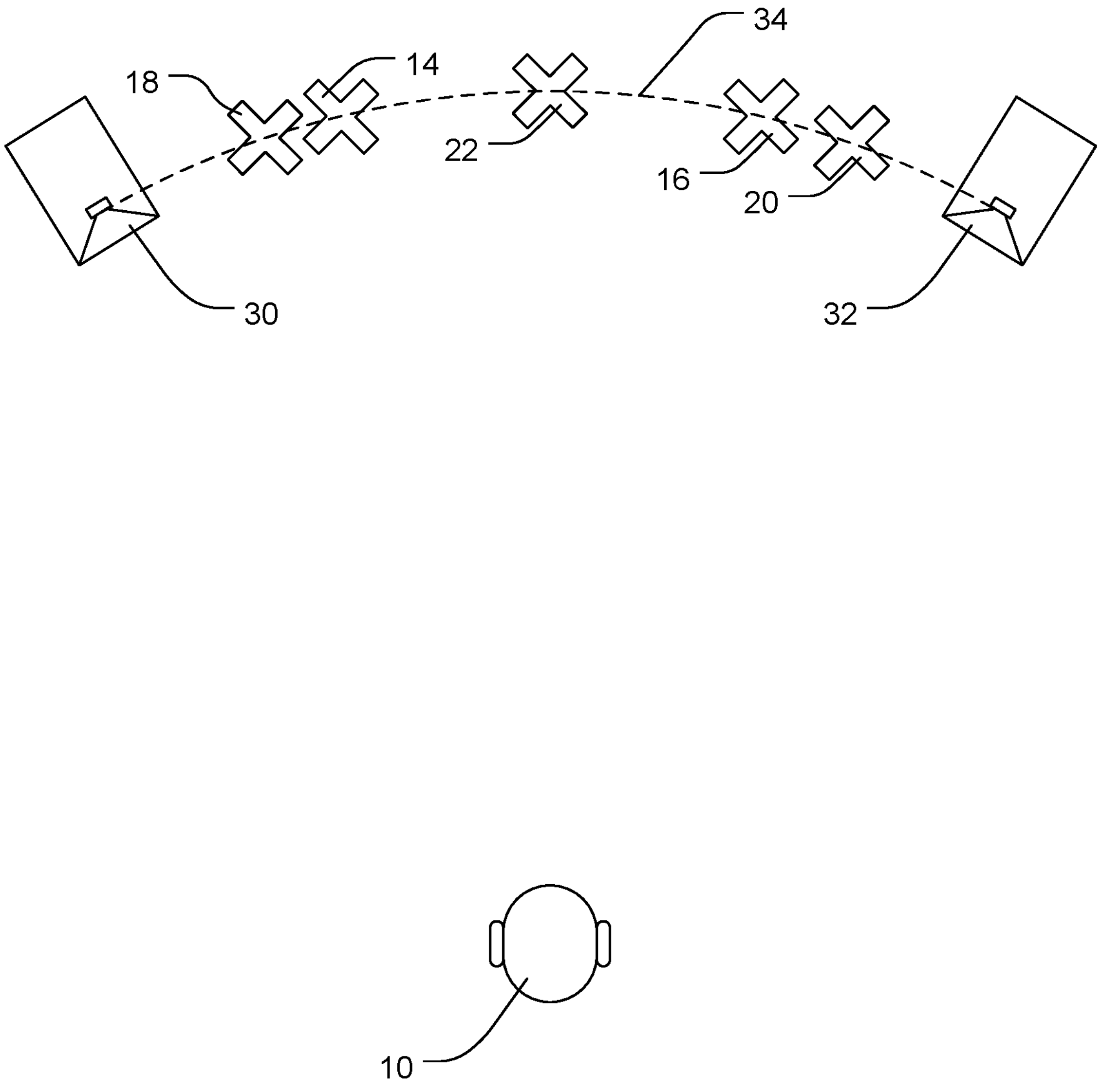
FIG. 2 (Prior Art)
FIG. 2 shows a representative audio playback situation in accordance with traditional methods.

Alternatively, when the original source recordings are traditional two-track stereo recordings, embodiments of playback systems similar to that of FIG. 3 utilize a simulation mechanism to create a perception of proper depth. In this way, the system is not limited to the improper phantom concave sound surface 34 illustrated in FIG. 2, but instead creates a perception of increased sound field depth, more akin to the original listening experience of FIG. 1. While the resulting experience may not provide the full experience of four-track recording and playback, it is a significant improvement over the artificial-feeling concave sound surface 34 of FIG. 2.

Figure 4:
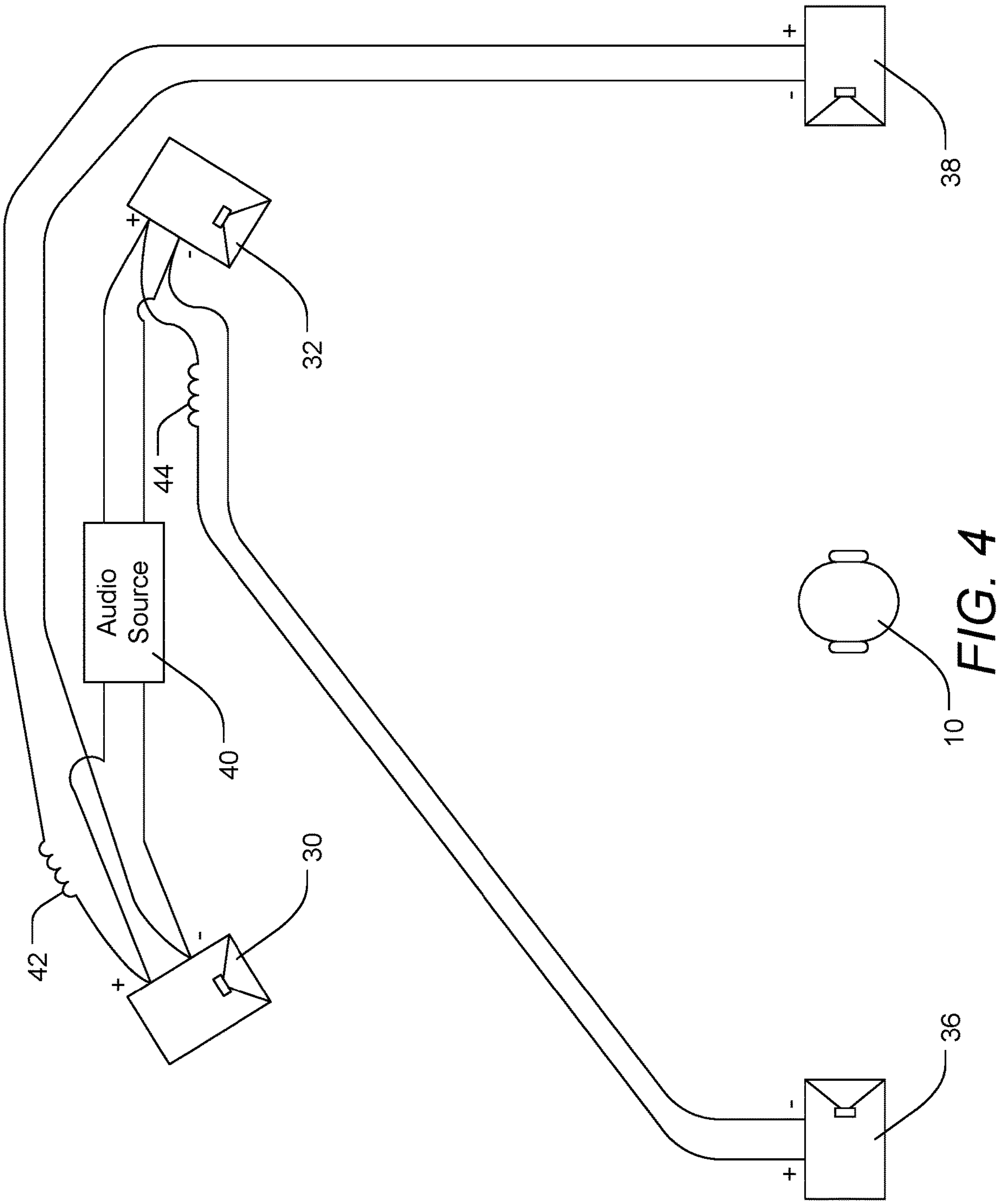
FIG. 4 shows an embodiment of an improved sound playback system.

To achieve this, as illustrated in FIG. 4, the traditional left stereo signal from an audio source 40 (the signal sent without attenuation to the left loudspeaker 30 of FIG. 3) is attenuated by being passed through a low-pass filter 42, and is then sent to the right localization loudspeaker 38. Similarly, the traditional right stereo signal (the signal sent without attenuation to the right loudspeaker 32 of FIG. 3) is attenuated by being passed through another low-pass filter 44, and is then sent to the left localization loudspeaker 36. In the embodiment illustrated in FIG. 4, the audio source 40 is a two-channel audio source.

Figure 5:
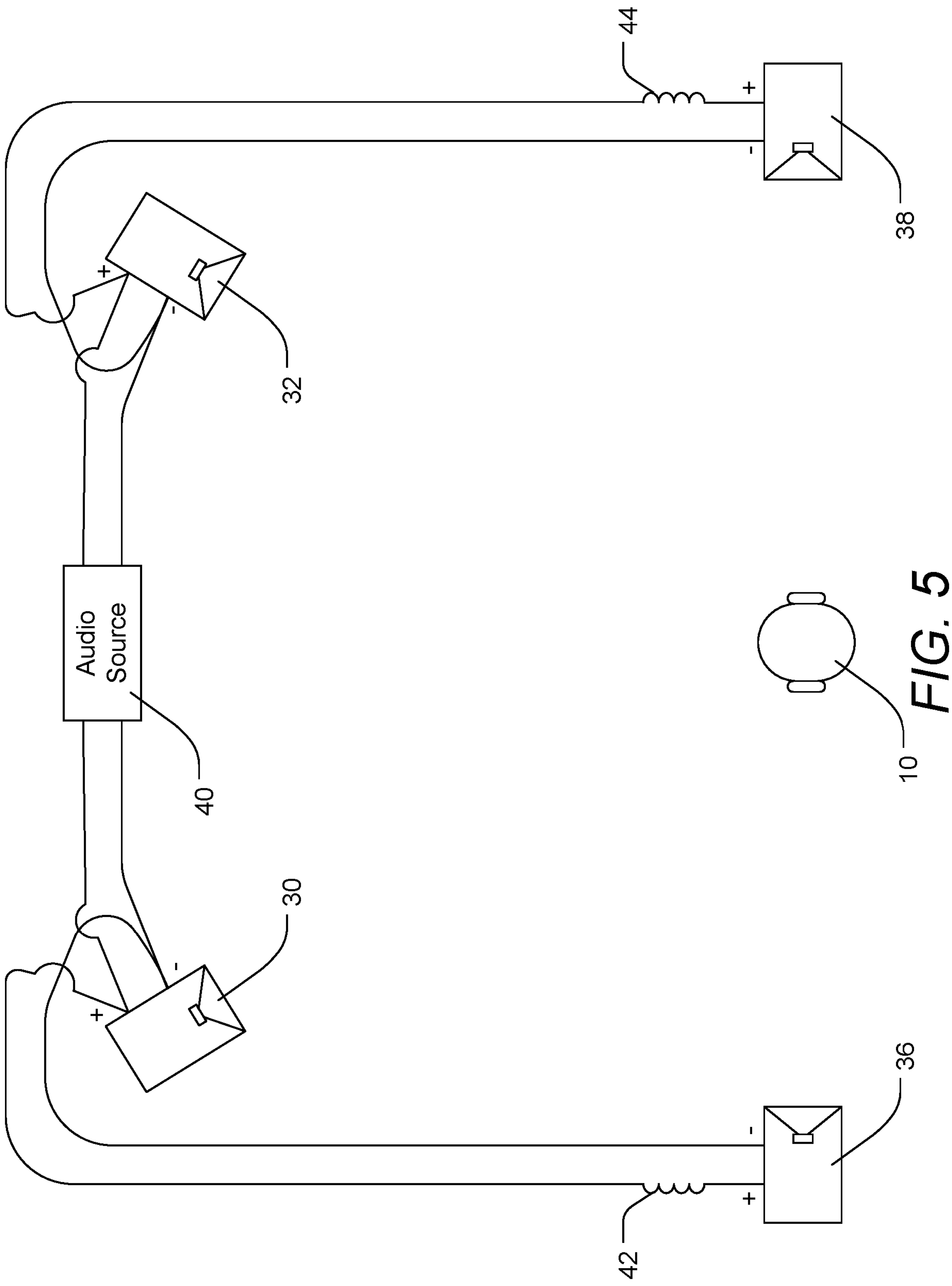
FIG. 5 shows an embodiment of an improved sound playback system.

In an alternate embodiment, as illustrated in FIG. 5, the traditional left stereo signal from the audio source 40 is attenuated by being passed through the low-pass filter 42 and is then sent to the left localization loudspeaker 36. Similarly, the traditional right stereo signal is attenuated by being passed through the other low-pass filter 44, and is then sent to the right localization loudspeaker 38. In the embodiment illustrated in FIG. 5, the audio source 40 is also a two-channel audio source. In the embodiment illustrated in FIG. 5, the resulting simulated depth effect may be experienced slightly differently than the simulated depth effect of the embodiment of FIG. 4, but the embodiment of FIG. 5 still serves to avoid the concave sound stage effect of prior-art sound playback systems.

In alternate embodiments of the invention, the audio source 40 (or one of its components) is a four-channel audio source that is adapted to detect whether the source recording is a four-track source recording that maintains the original depth of sound field information, as discussed further below, or is a traditional two-track stereo recording. When a traditional two-track stereo recording is detected, the audio source 40 (or one of its components) automatically applies the low-pass filtering provided by the low-pass filters 42, 44 of the embodiment in FIG. 4 or the embodiment of FIG. 5 internally to the audio source 40, and separate low-pass filters are not necessary for the left localization loudspeaker 36 or the right localization loudspeaker 38. Thus, playback embodiments of the invention may provide improved localization with both traditional and four-track stereo recordings without requiring reconfiguration of the system.

In certain embodiments, the left loudspeaker 30, the right loudspeaker 32, the left localization loudspeaker 36, and the right localization loudspeaker 38 are all wireless loudspeakers connected to the audio source 40 by a wireless connection. In such embodiments, the low-pass filtering may be provided by the audio source 40. In some embodiments, however, the low-pass filtering may be provided by circuitry internal to the left localization loudspeaker 36 and the right localization loudspeaker 38. Accordingly, in some such embodiments, the audio source 40 may simply broadcast its right channel and left channel. The right channel is received by both the right loudspeaker 32 and the left localization loudspeaker 36 (or the right loudspeaker 32 and the right localization loudspeaker 38 in embodiments akin to the embodiment of FIG. 5), but the left localization loudspeaker 36 applies the low-pass filtering before transducing the right channel into audible sounds. Similarly, the left channel is received by both the left loudspeaker 32 and the right localization loudspeaker 38 (or the left loudspeaker 30 and the left localization loudspeaker 36 in embodiments akin to the embodiment of FIG. 5), but the right localization loudspeaker 38 applies the low-pass filtering before transducing the left channel into audible sounds. Accordingly, in some embodiments, the sound source need not be inherently capable of producing improved localization through four channel sound, but embodiments of the invention may be provided essentially internally to the left localization loudspeaker 36 and the right localization loudspeaker 38, regardless of whether they are physically connected or wirelessly connected to the audio source 40.

In the embodiments of FIGS. 3-5, the loudspeakers may be any type of loudspeaker.

While it may be desirable to use as high quality and accurate loudspeakers as are reasonably possible to achieve higher fidelity in sound reproduction, embodiments of the invention provide advantages to systems of any cost. Accordingly, in inexpensive or less-expensive systems, the loudspeakers may be lower-cost speakers, including one-way and two-way loudspeakers. In such systems, while the loudspeakers may not be as accurate or powerful as higher-end loudspeakers, the localization benefits of embodiments of the invention may still be realized. In high-end systems, the loudspeakers may be higher-end loudspeakers, and may include multi-way loudspeakers and the like. Essentially, loudspeakers of any quality may be used in embodiments of the invention as illustrated in FIGS. 3-5.

According to some embodiments of the invention, traditional sound playback systems may be adapted to incorporate the four-channel loudspeaker features illustrated in FIGS. 3-5. By way of example, traditional 7.1 or 7.2 sound systems provide side surround loudspeakers that are traditionally placed approximately at the location of the left localization loudspeaker 36 and the right localization loudspeaker 38 illustrated in FIGS. 3-5. Accordingly, embodiments of the invention may be provided by a modified 7.1 or 7.2 sound system adapted to utilize the side surround loudspeakers in accordance with the principals discussed with respect to FIGS. 3-5. In such systems, the loudspeakers of the system may still be used in the traditional 7.1 or 7.2 methods with sound recordings adapted for such, but could be used to provide four-track playback of four-track recordings (as per FIG. 3), as well as simulated localization of two-track stereo recordings (as per FIG. 4 or 5) with processing on the audio source 40. Accordingly, it should be understood that embodiments of the invention may be adapted for use with existing systems or that existing systems may be modified to provide features in accordance with embodiments of the invention disclosed herein. Existing 7.1 or 7.2 sound systems are only one example of a traditional system that may be adapted for use with or modified for use as embodiments of the present invention.

Figure 6:
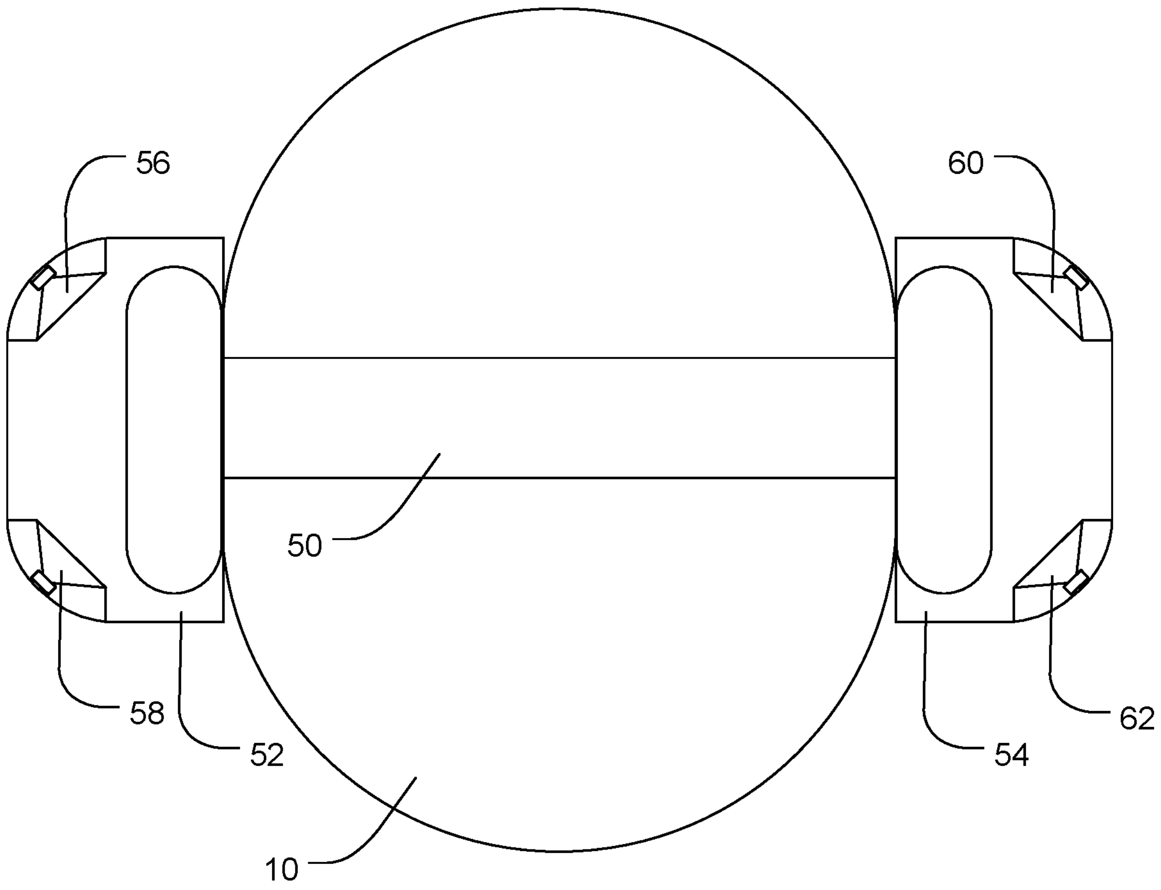
FIG. 6 shows an embodiment of a headphone-type improved sound playback system.

Embodiments of the invention may also be provided with respect to on-ear or over-the-ear headphones, as illustrated in FIG. 6. Traditional headphones provide a stereo experience where the listener experiences an effect similar to the phantom concave sound surface 34 illustrated in FIG. 4, but instead of perceiving sound on a concave sound surface in front of the listener, the listener perceives sound as emanating from a line passing through the listener's head/ears. More centralized sounds are experienced as if they emanated from within the middle of the listener's head, while full right or full left stereo sounds are perceived as coming from the respective ear, not from any location in front of the listener.

Headphone or earphone embodiments of the invention, as illustrated in FIG. 6, address this deficiency and allow the listener 10 to perceive or localize the sound as coming from a sound field, with depth, generally in front of the listener 10 instead of inside the listener's head. According to the illustrated embodiment, a headphone 50 includes a left ear cup 52 and a right ear cup 54. The left ear cup 52 includes a left main speaker 56 (analogous to the left loudspeaker 30) and a left rear speaker 58 (analogous to the left localization loudspeaker 36). The right ear cup 54 includes a right main speaker 60 (analogous to the right loudspeaker 32) and a right rear speaker 62 (analogous to the right localization loudspeaker 38).

According to some embodiments, each of the left main speaker 56 and the right main speaker 60 may be composed of a plurality of speaker components, including treble and bass reproduction units or multiples thereof, and the like. There is no particular limit to the number of speaker components that may make up each of the left main speaker 56 and the right main speaker 60, which can each be composed of a range of from one to many speaker components capable of reproduction of a variety of frequencies. Similarly, each of the left rear speaker 58 and the right rear speaker 62 may be composed of a plurality of speaker components, including treble and bass reproduction units or multiples thereof, and the like. There is no particular limit to the number of speaker components that may make up each of the left rear speaker 58 and the right rear speaker 62, which can each be composed of a range of from one to many speaker components capable of reproduction of a variety of frequencies.

As discussed, the left main speaker 56 is analogous to the left loudspeaker 30 of FIGS. 3-5, and the right main speaker 60 is analogous to the right loudspeaker 32 of FIGS. 3-5. Accordingly, these components could receive outputs corresponding to similar tracks of the two- or four-track recordings. Similarly, the left rear speaker 58, being analogous to the left localization loudspeaker 36 of FIGS. 3-5 and the right rear speaker 58, being analogous to the right localization loudspeaker 38 of FIGS. 3-5, could receive outputs corresponding to similar tracks of the two- (passed through the low-pass filters 42, 44 or upon corresponding processing from an applicable sound source) or four-channel recordings.

According to some embodiments, the headphone 50 receives two-channel inputs, which are passed to the left main speaker 56 and the right main speaker 60, and to which low-pass filters integral to the headphone 50 (not shown) are applied and then the inputs are passed to the opposite left rear speaker 58 and right rear speaker 62 (similar to FIG. 4 but within the headphone 50). According to other embodiments, the headphone 50 receives two-channel inputs that are passed to the left main speaker 56 and the right main speaker 60, and to which low-pass filters integral to the headphone 50 (not show) are applied and then the inputs are passed to the same-ear left rear speaker 58 and the right ear speaker 64 (similar to FIG. 5 but within the headphone 50). According to other embodiments, the headphone 50 receives four channels of inputs adapted to separately drive each of the left main speaker 56, the left rear speaker 58, the right main speaker 60, and the right rear speaker 62. In such embodiments, the audio source is adapted to provide a four-channel output, including, potentially, by way of a novel connector (e.g., jack and plug) for connection of the headphone 50. In some embodiments, the headphone 50 could use multiple instances of an existing connector (e.g., jack and plug) to provide for four-channel inputs.

According to alternate embodiments, the headphone 50 is a wireless headphone, and receives all necessary channels (e.g., two channels or four channels) of inputs wirelessly, such as via a Bluetooth connection or any other applicable wireless connection. In wireless embodiments of the headphone 50, the headphone 50 includes a power source and circuitry to provide four channels of amplification sufficient to separately drive the left main speaker 56, the left rear speaker 58, the right main speaker 60, and the right rear speaker 62. In wireless embodiments of the headphone 50 where the headphone 50 receives two channels of inputs, the headphone 50 includes circuitry to deliver the two channels of inputs to the left main speaker 56 and to the right main speaker 60, and to pass the left and right inputs through low-pass filters (or the equivalent) and then to deliver the filtered left channel to the right rear speaker 62 and the filtered right channel to the left rear speaker 58 (as per FIG. 4 but within the headphone 50).

According to some embodiments, the headphone 50 is adapted to receive both two-channel (traditional stereo) inputs and four-channel inputs and to handle each appropriately. In some such embodiments, the headphone 50 is wireless. In some wireless embodiments, the headphone 50 detects whether the wirelessly received input is a two-channel input or a four-channel input, and handles each appropriately. If the received wireless input is a two-channel input, the headphone 50 supplies the right and left channels to the right main speaker 60 and the left main speaker 56, respectively, applies low-pass filtering to the right and left channels, and supplies the filtered right and left channels to the left rear speaker 58 and the right rear speaker 62, respectively. If the received wireless input is a four-channel input, the headphone 50 may simply supply the respective channels to the respective speakers. Alternatively, in some embodiments, the headphone 50 may detect from the incoming signal whether any applicable low-pass filtering or other appropriate processing has already been applied to the rear sound channels, and may apply low-pass filtering or other appropriate processing to the rear sound channels as necessary.

In other embodiments the headphone 50 that is adapted to receive both two-channel and four-channel inputs may be a wired headphone. In some such embodiments, the headphone 50 may include two separate adapters, plugs, or jacks to separately receive two-channel inputs and four-channel inputs, and the user of the headphone simply plugs in the appropriate adapter, plug, or jack. In other embodiments, the headphone 50 includes a single adapter, plug, or jack that is adapted to receive both two-channel and four-channel inputs, such as an adapter, plug, or jack that adopts an existing shape or form of adapter, plug, or jack, but includes additional separate contact areas to permit reception of additional channels of audio. Regardless, as with wireless embodiments of the headphone 50, the wired embodiments of the headphone 50 are adapted to detect whether a two-channel or a four-channel input is received, and handles each appropriately. If the received wireless input is a two-channel input, the headphone 50 supplies the right and left channels to the right main speaker 60 and the left main speaker 56, respectively, applies low-pass filtering to the right and left channels, and supplies the filtered right and left channels to the left rear speaker 58 and the right rear speaker 62, respectively. If the received wireless input is a four-channel input, the headphone 50 may simply supply the respective channels to the respective speakers. Alternatively, in some embodiments, the headphone 50 may detect from the incoming signal whether any applicable low-pass filtering or other appropriate processing has already been applied to the rear sound channels, and may apply low-pass filtering or other appropriate processing to the rear sound channels as necessary.

The exact positioning of the left main speaker 56, the left rear speaker 58, the right main speaker 60 and the right rear speaker 62, or their various component sound-reproducing components, within the left ear cup 52 and the right ear cup 54 can be adapted based on the geometries of the left ear cup 52 and the right ear cup 54. As the geometries of the left ear cup 52 and the right ear cup 54 are subject to modification for a variety of acoustic and visual aesthetic reasons, so specific single placement of components within the left ear cup 52 and the right ear cup 54 adapted to fit every headphone design can be described, but proper placement to achieve a desired localization experience is a matter of routine experimentation within the ordinary skill of a headphone designer.

Certain additional embodiments of the invention relate to in-ear headphones and even hearing aids. Such embodiments also utilize multiple sound transducers as with the headphones 50 illustrated in FIG. 6. However, the placement of the sound transducers corresponding to the left main speaker 56, the left rear speaker 58, the right main speaker 60 and the right rear speaker 62 for the in-ear headphone or hearing aids may be varied to ensure that the localization effect is preserved. Correct placement may be determined, in part, by use of embodiments of headphones 50 similar to that of FIG. 6 or by use of loudspeaker systems similar to those illustrated in FIGS. 3-5 in conjunction with an anatomically correct model of representative ear canals to determine the direction and manner in which sound enters the ear canal to permit localization reproduction in in-ear headphones and hearing aids having multiple sound transducers. In hearing aid embodiments, the hearing aid or external portions thereof may be equipped with multiple microphones and appropriate filtering as discussed below with respect to the embodiments of FIGS. 7-10. Accordingly, embodiments of the invention are not limited to traditional over-the-ear or on-ear headphones as illustrated in FIG. 6.

Loudspeaker systems and headphones as discussed herein provide improved depth of the perceived sound field, regardless of whether the loudspeaker systems and headphones are used with traditional two-channel stereo recordings or with four-channel or four-track stereo recordings. Nevertheless, it is anticipated that the listener 10 will experience sound in a manner most akin to experiencing a live performance (as per FIG. 1) when the sound playback system utilizes recordings that have been made using four channels or tracks, in which the four channels or tracks are designed to capture sound the way in which the human ear and brain discern sound. Accordingly, certain embodiments of the invention related to sound recording systems designed to capture sound in the way in which the human ear and brain discern sound.

Such embodiments of the invention recognize the directionality of the manner in which the human ears capture sound, as well as recognizing that each human's ears are a distance apart from each other and on opposite sides of a head that affects the way that the ears receive sounds from different directions. The ears generally perceive sounds having wavelengths longer than about five inches (about 12.5 cm) as being omnidirectional, while higher-frequency, shorter-wavelength sounds are more directional in nature. Embodiments of the recording system utilize two microphones for each ear, placed to record approximately at locations representing ear locations (e.g. with two generally co-located microphones each spaced approximately 5 to 7 inches (approximately 12-18 cm) apart from the other two co-located microphones), with each microphone's recording recorded to a separate channel or track.

Figure 7:
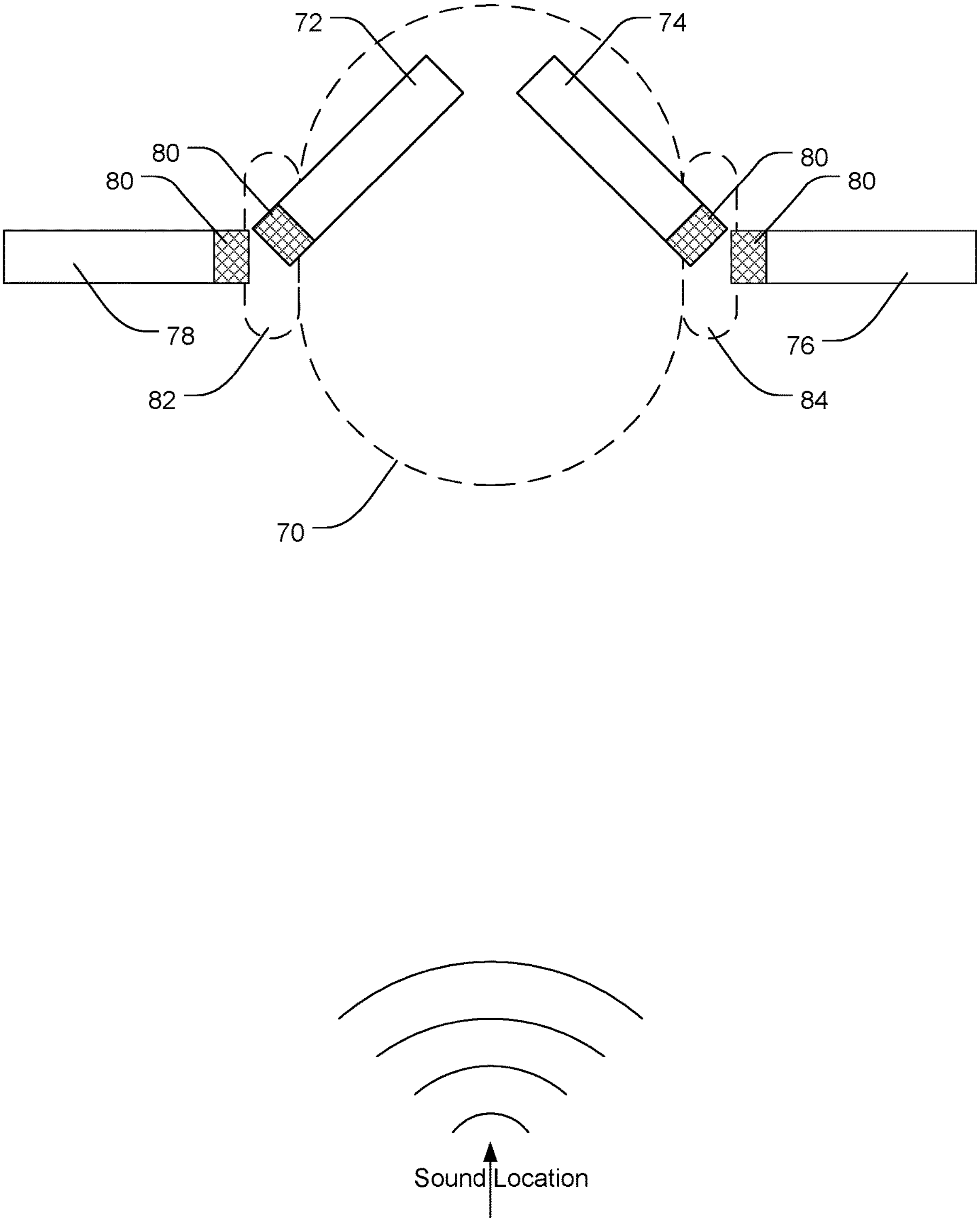
FIG. 7 shows an embodiment of an improved sound recording system.
Figure 8:
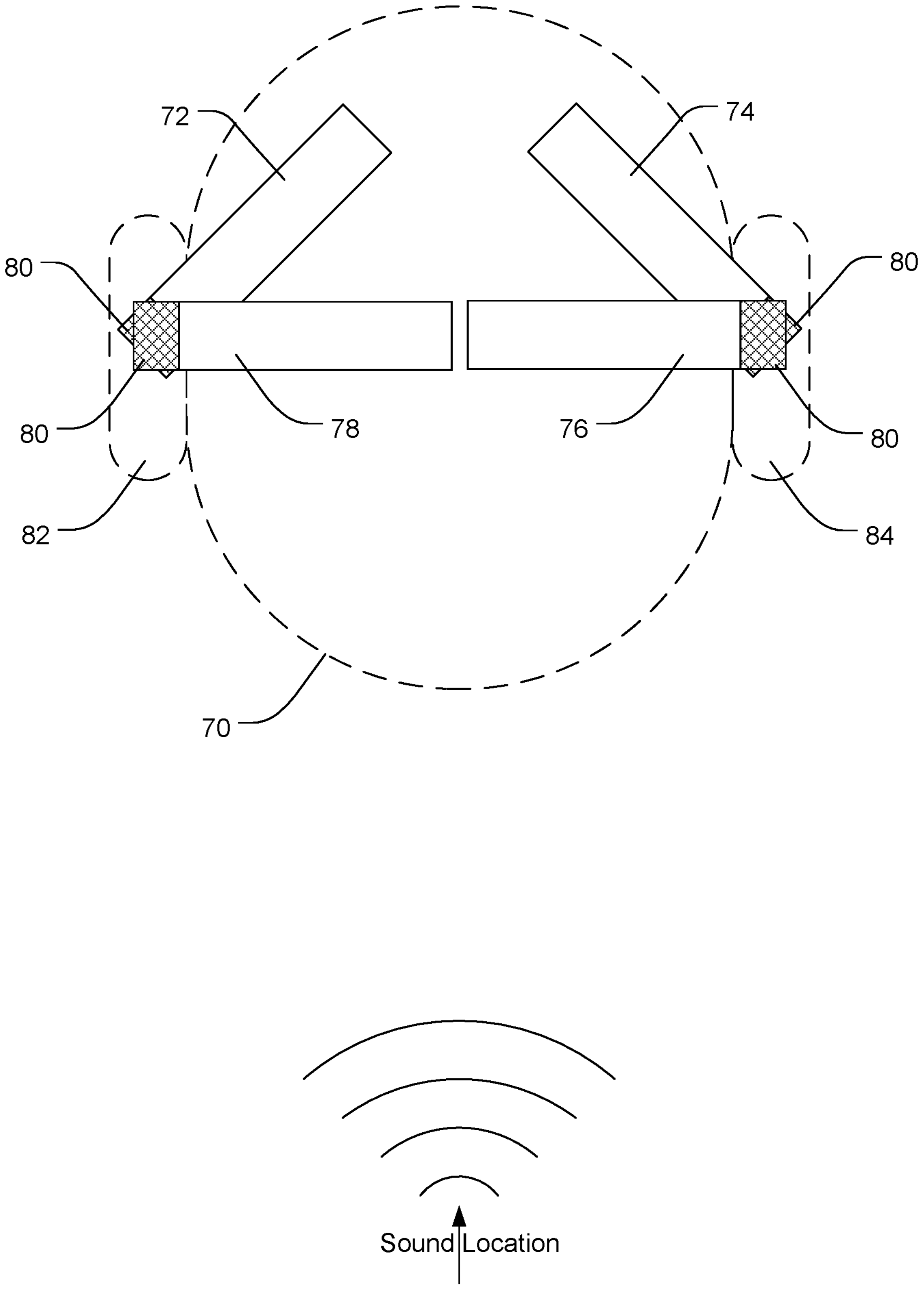
FIG. 8 shows an embodiment of an improved sound recording system.
Figure 9:
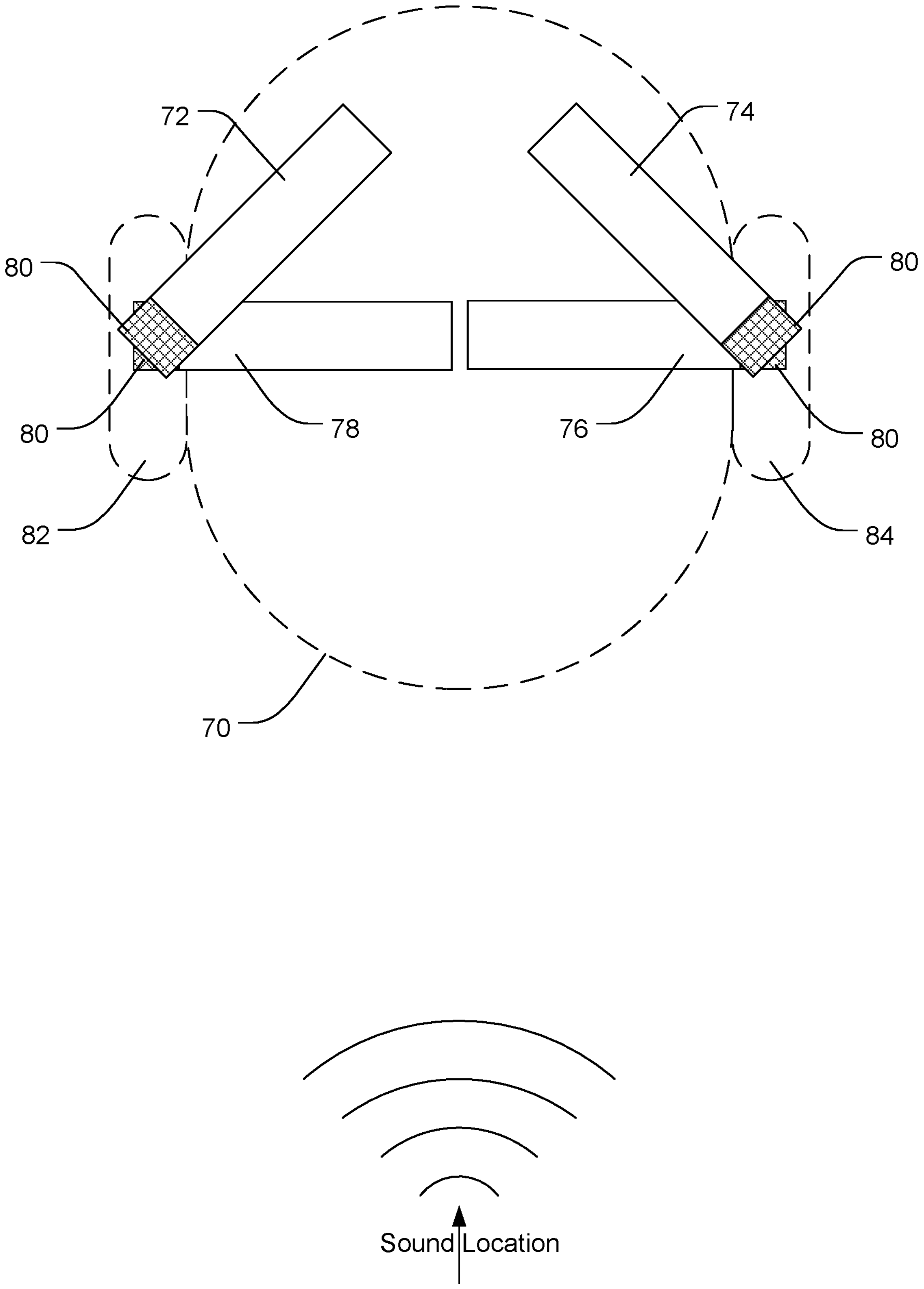
FIG. 9 shows an embodiment of an improved sound recording system.
Figure 19:
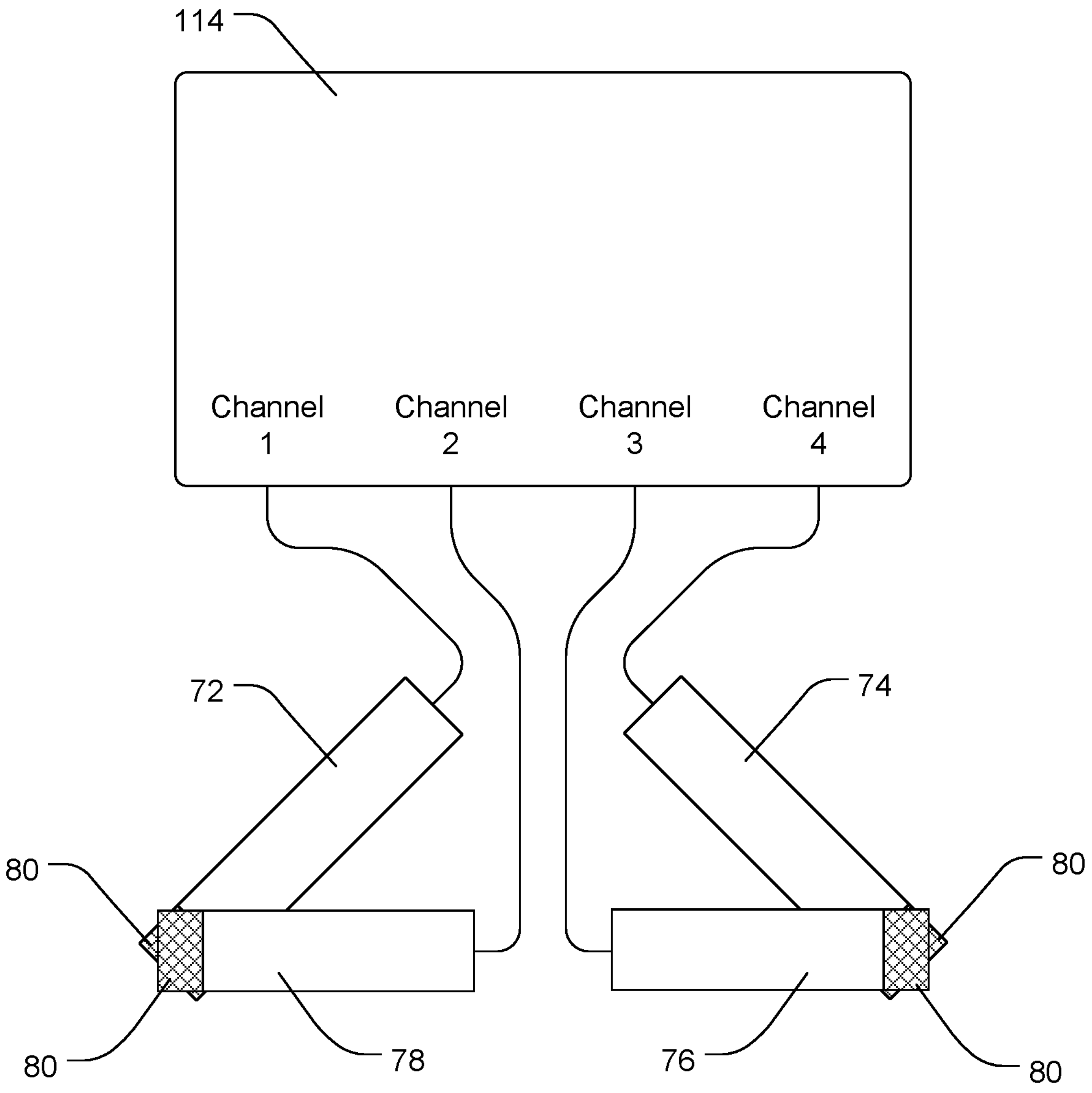
FIG. 19 shows an embodiment of an improved sound recording system.

The microphones of each ear-representative location are aimed and configured to capture sounds in the way in which the ear captures sound. One illustrative embodiment is illustrated in FIG. 7, and other illustrative embodiments are shown in FIGS. 8 and 9. In these illustrations, only the microphones are illustrated, not the accompanying wires or other recording equipment. Such equipment is traditional in nature other than that it is configured for four-track or four-channel recording in which the channels are maintained separate throughout the recording process so that they can be played back as four separate channels as well. Accordingly, such equipment is not shown in FIGS. 7-9, though FIG. 19 illustrates one embodiment of a system with four microphones and a four-channel recorder 114.

In FIGS. 7-9, the microphones are shown in an array of microphones in relation to an imaginary human head 70, illustrating that the microphones of the array are located such that their sound-transducing elements (e.g., condenser or diaphragm) are positioned at what would be the location of an average human ear and are also oriented to "hear" in the way that the human ear would hear. Accordingly, the microphones of the array are spaced such that the sound-transducing elements of two groups of two microphones are spaced approximately 5 to 7 inches (approximately 12 to 18 cm) apart.

In the embodiment of FIG. 7, the array of microphones includes a right primary microphone 72 and a left primary microphone 74. The array of microphones also includes a left side-viewing microphone 76 positioned to capture the sounds that a human ear would perceive as coming in from the right side of the sound field and discerned by the left ear, and a right side-viewing microphone 78 positioned to capture the sounds that a human ear would perceive as coming in from the left side of the sound field and discerned by the right ear.

As may be seen in FIG. 7, the right primary microphone 72 and the left side-viewing microphone 76 may have their sound-transducing elements 80 generally co-located at a location approximating a location of what would be the right ear 82 of the human head 70. Similarly, the left primary microphone 74 and the right side-viewing microphone 78 may have their sound-transducing elements 80 generally co-located at a location approximating a location of what would be the left ear 84 of the human head 70. As the various microphones cannot have their respective sound-transducing elements 80 actually occupy the physical space occupied by a part of another microphone, being generally co-located is intended to convey that the sound-transducing elements 80 are relatively close to each other, within the realm of what is physically possible without obstructing the sound-transducing elements' ability to receive incoming sound waves.

By way of example, the sound-transducing element 80 of the right side-viewing microphone 78 may be placed slightly to the side of the sound-transducing element 80 of the right primary microphone 72, as illustrated in FIG. 7. Alternatively, the sound-transducing element 80 of the right side-viewing microphone 78 may be placed slightly above the sound-transducing element 80 of the right primary microphone 72, as illustrated in FIG. 8. Alternatively, the sound-transducing element 80 of the right side-viewing microphone 78 may be placed slightly below the sound-transducing element 80 of the right primary microphone 72, as illustrated in FIG. 9.

Similarly, the sound-transducing element 80 of the left side-viewing microphone 76 may be placed slightly to the side of the sound-transducing element 80 of the left primary microphone 74, as illustrated in FIG. 7. Alternatively, the sound-transducing element 80 of the left side-viewing microphone 76 may be placed slightly above the sound-transducing element 80 of the left primary microphone 74, as illustrated in FIG. 8. Alternatively, the sound-transducing element 80 of the left side-viewing microphone 76 may be placed slightly below the sound-transducing element 80 of the left primary microphone 74, as illustrated in FIG. 9.

The right primary microphone 72 and the left primary microphone 74 may each be cardioid microphones having a full-spectrum frequency response (a frequency response equivalent to the full range of human hearing, or approximately 20 Hz to approximately 20 kHz). As illustrated in FIGS. 7-9, the right primary microphone 72 and the left primary microphone 74 may be oriented at an angle outward from a primary axis toward the center of the sound location. In some embodiments, the right primary microphone 72 and the left primary microphone 74 are each directed outward at an angle of approximately 45° from the central axis, or at an angle of approximately 90° from each other. In other embodiments, the right primary microphone 72 and the left primary microphone 74 are each directed outward at an angle of between approximately 40° and approximately 50° from the central axis, or at an angle of between approximately 80° to approximately 100° from each other. In other embodiments, the right primary microphone 72 and the left primary microphone 74 are each directed outward at an angle of between approximately 35° and approximately 55° from the central axis, or at an angle of between approximately 70° to approximately 110° from each other.

Figure 12:
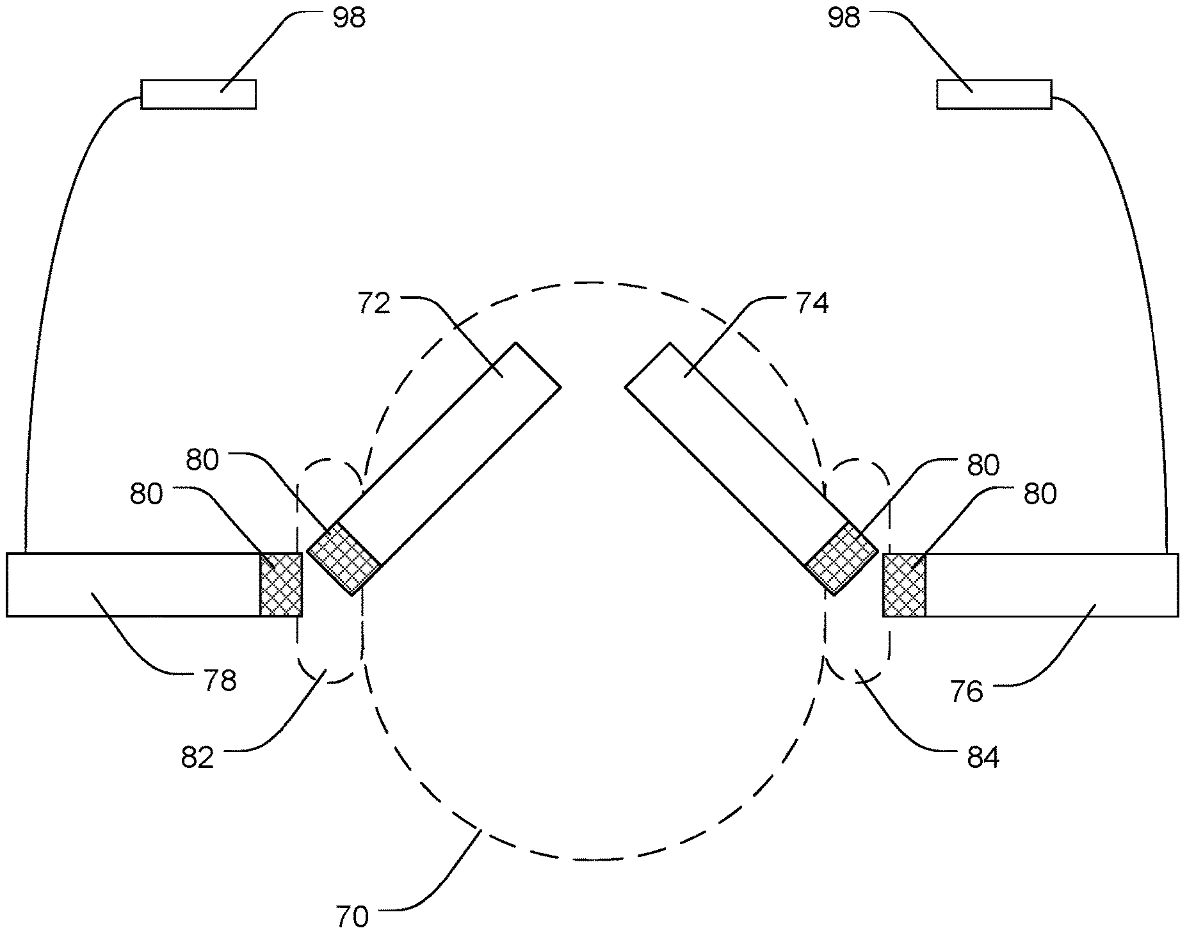
FIG. 12 shows an embodiment of an improved sound recording system.
Figure 13:
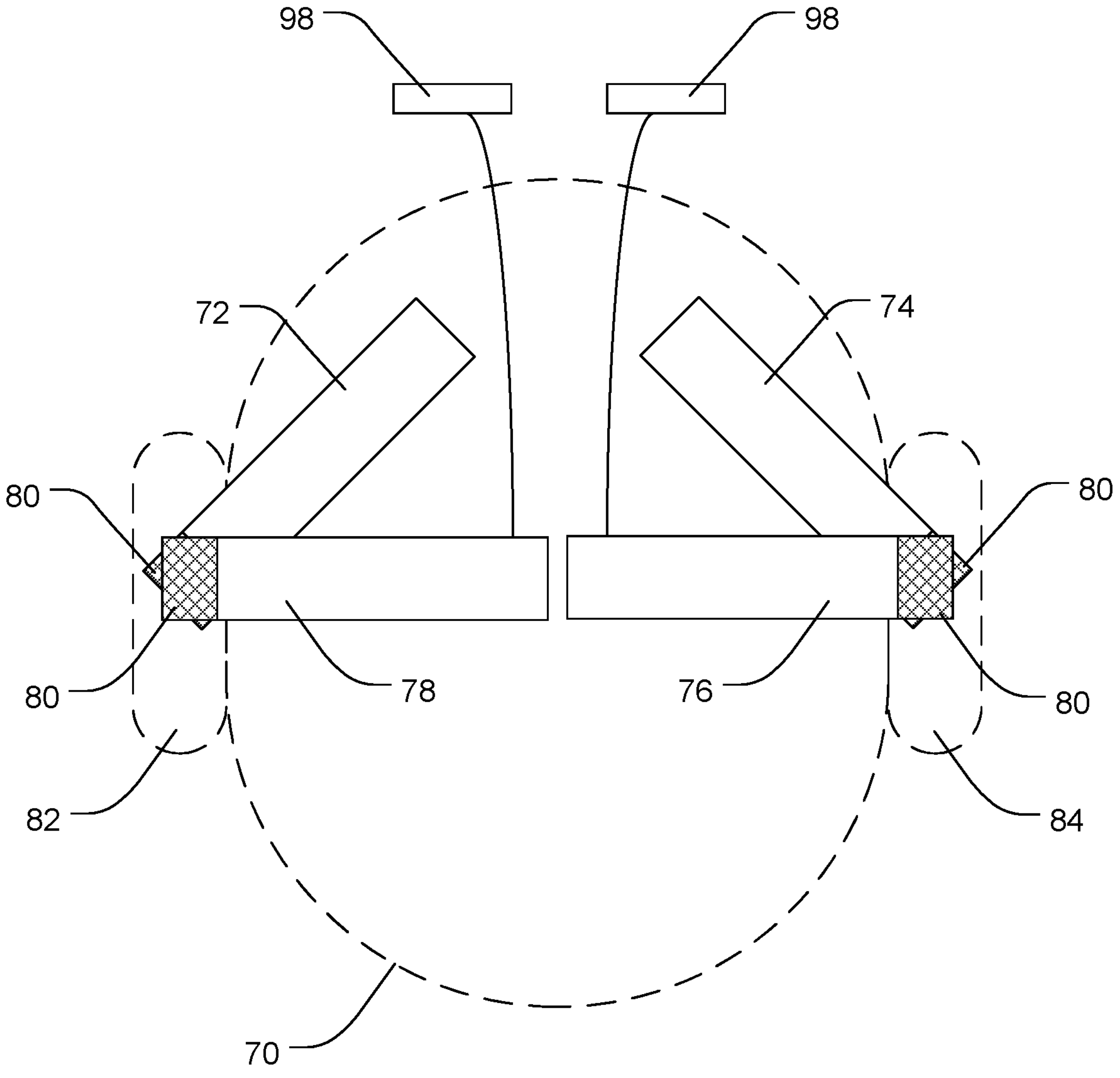
FIG. 13 shows an embodiment of an improved sound recording system.

The left side-viewing microphone 76 and the right side-viewing microphone 78 may each be omnidirectional microphones that either naturally have a reduced-range frequency response, that have a physical structure affixed thereto to achieve a reduced-range frequency response, or that have a low-pass electronic filter 98 applied thereto, such as illustrated in FIGS. 12 and 13, to achieve a reduced-range frequency response. The reduced-range frequency response may be a frequency response between approximately 20 Hz to approximately 2.2 kHz, a frequency response between approximately 20 Hz to approximately 2.0 kHz, a frequency response between approximately 20 Hz to approximately 2.5 kHz, a frequency response between approximately 20 Hz on the low end and between approximately 2.0 kHz and approximately 2.5 kHz on the high end, or a frequency response between approximately 20 Hz on the low end and between approximately 1.8 kHz and approximately 3.0 kHz on the high end. This reduced-range frequency response effectively captures the way the human ear captures and perceives sound coming from the opposite side of the head as being omnidirectional at lower frequencies but being blocked by the head at higher frequencies.

In other embodiments, the left side-viewing microphone 76 and the right side-viewing microphone 78 may be directional microphones instead of omnidirectional microphones. In some such embodiments, the directionality of the left side-viewing microphone 76 and the right side-viewing microphone 78 may participate in achieving the reduced-range frequency response discussed above. Accordingly, in such embodiments, the low-pass filtering may be modified as appropriate to achieve the desired response.

Figure 14:
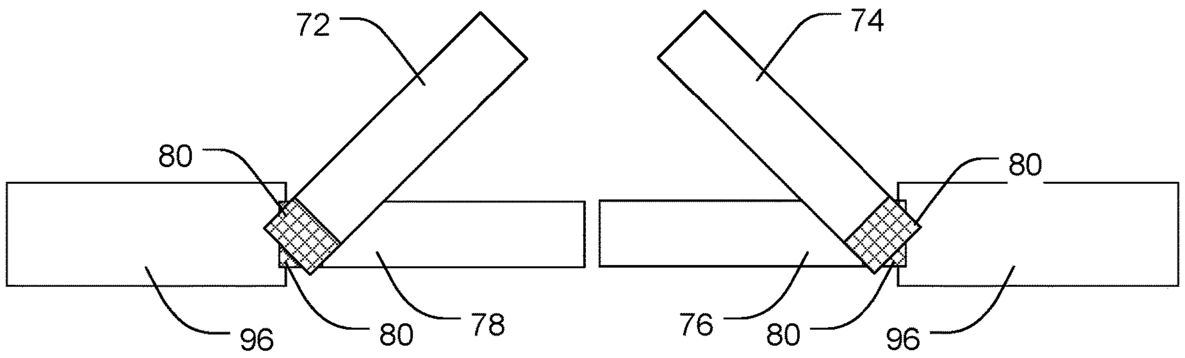
FIG. 14 shows an embodiment of an improved sound recording system.

In some embodiments, the low-pass filtering may be achieved by a physical structure, such as by placing each of the left side-viewing microphone 76 and the right side-viewing microphone 78 in individual tubes 96 that extends some distance beyond the sound-transducing element 80 of the respective microphones, as illustrated in FIG. 14, so as to limit the sounds reaching the left side-viewing microphone 76 and the right side-viewing microphone 78 to lower-frequency sounds. In other embodiments, the low-pass filtering may be incorporated into the microphones themselves. In other embodiments, the low-pass filtering may be applied by sound-recording equipment connected to the left side-viewing microphone 76 and the right side-viewing microphone 78. In still other embodiments, the low-pass filtering may be applied after-the-fact to tracks recorded by the left side-viewing microphone 76 and the right side-viewing microphone 78. In still other embodiments, the low-pass filtering may be applied at the point of audio playback by audio playback equipment or by the presence of low-pass filters 42 discussed previously.

According to some embodiments of the invention, the low-pass filtering applied to the left side-viewing microphone 76 and the right side-viewing microphone 78 may attenuate higher frequencies at a rate of approximately 6 dB per octave above the selected cutoff point (e.g., being a first-order filter). In other embodiments of the invention, the low-pass filter applied to the left side-viewing microphone 76 and the right side-viewing microphone 78 may attenuate higher frequencies at some other rate, such as at 3 dB per octave, at 4.5 dB per octave, at 9 dB per octave, at 12 dB per octave, or at some other selected rate. The filtering applied may be applied using first order, second order, third order, or higher orders of filters. Similarly, first order filters, second order filters, third order filters, and the like, and technical equivalents of the same may be used for filtering recordings on the recording side (e.g., with the microphones or internally to the recording unit), at a subsequent stage prior to or upon transferring the recording to a playable medium, at the playback stage (e.g., by the audio source 40), at the connections between the audio source 40 and the left localization loudspeaker 36 and the right localization loudspeaker 38 (in non-headphone audio playback systems) or the left rear speaker 58 and the right rear speaker 62 (in headphones), or within the left localization loudspeaker 36 and the right localization loudspeaker 38 or within the headphone 50 (for the left rear speaker 58 and the right rear speaker 62) as desired.

The left side-viewing microphone 76 and the right side-viewing microphone 78 may be oriented at essentially any direction within a plane generally encompassing the sound-transducing elements 80 of the various microphones. By way of example, in the embodiment of FIG. 7, the left side-viewing microphone 76 and the right side-viewing microphone 78 are illustrated as facing toward each other, while in FIGS. 8 and 9, the left side-viewing microphone 76 and the right side-viewing microphone 78 are illustrated as facing outward. In other examples that are not specifically illustrated, the left side-viewing microphone 76 and the right side-viewing microphone 78 may be directed upward or downward or at some angle between side-facing and upward, or at some angle between side-facing and downward.

Figure 15:
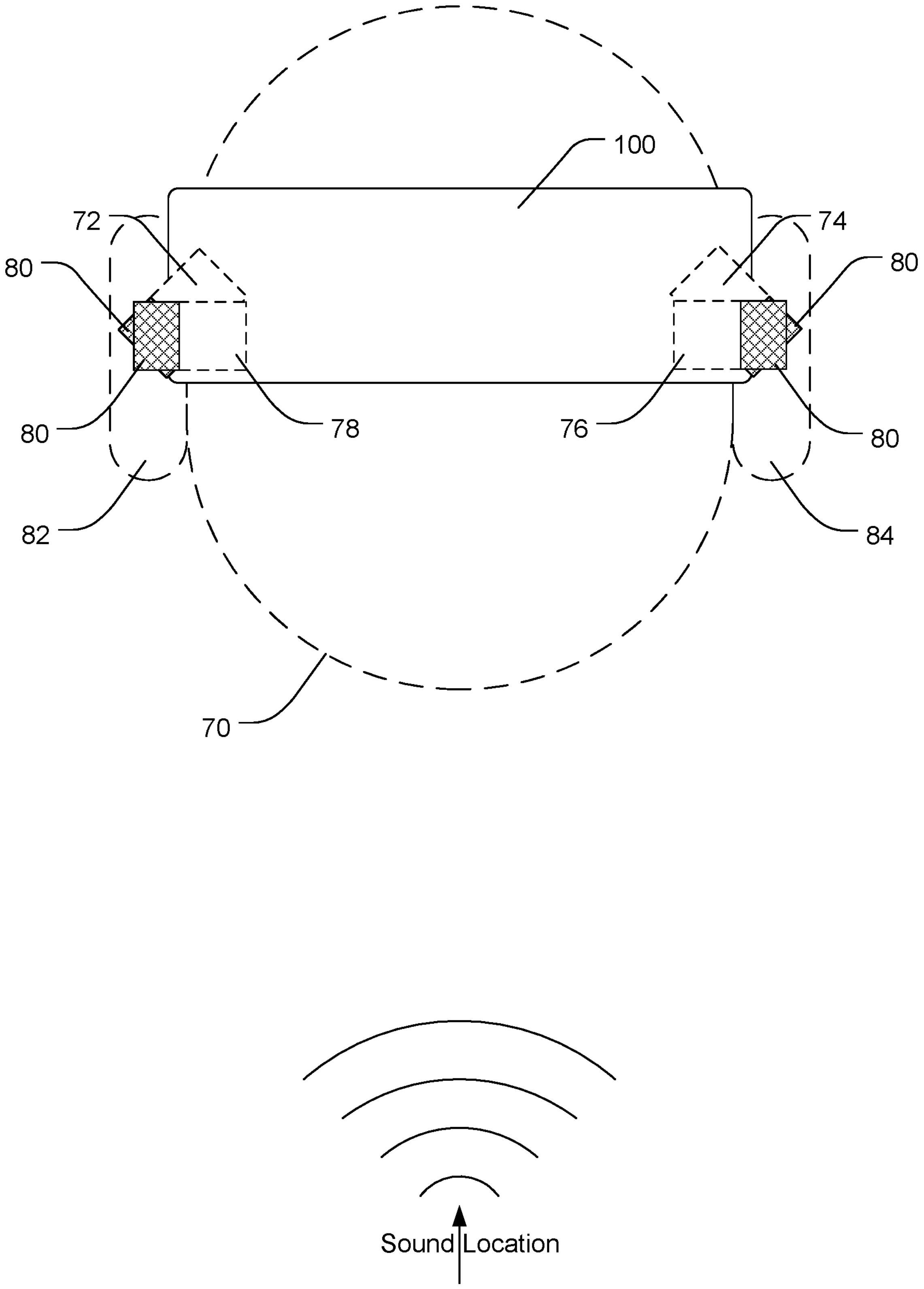
FIG. 15 shows an embodiment of an improved sound recording system.
Figure 16:
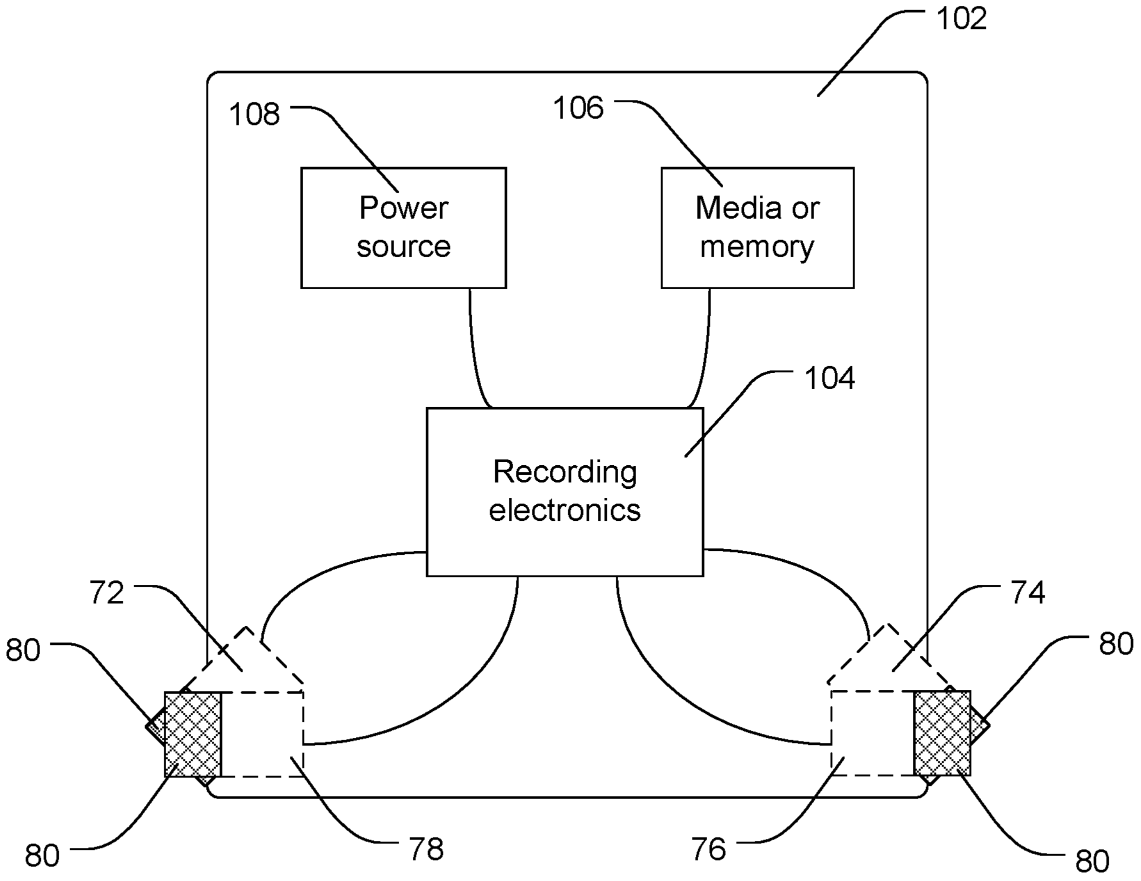
FIG. 16 shows an embodiment of an improved sound recording system.
Figure 17:
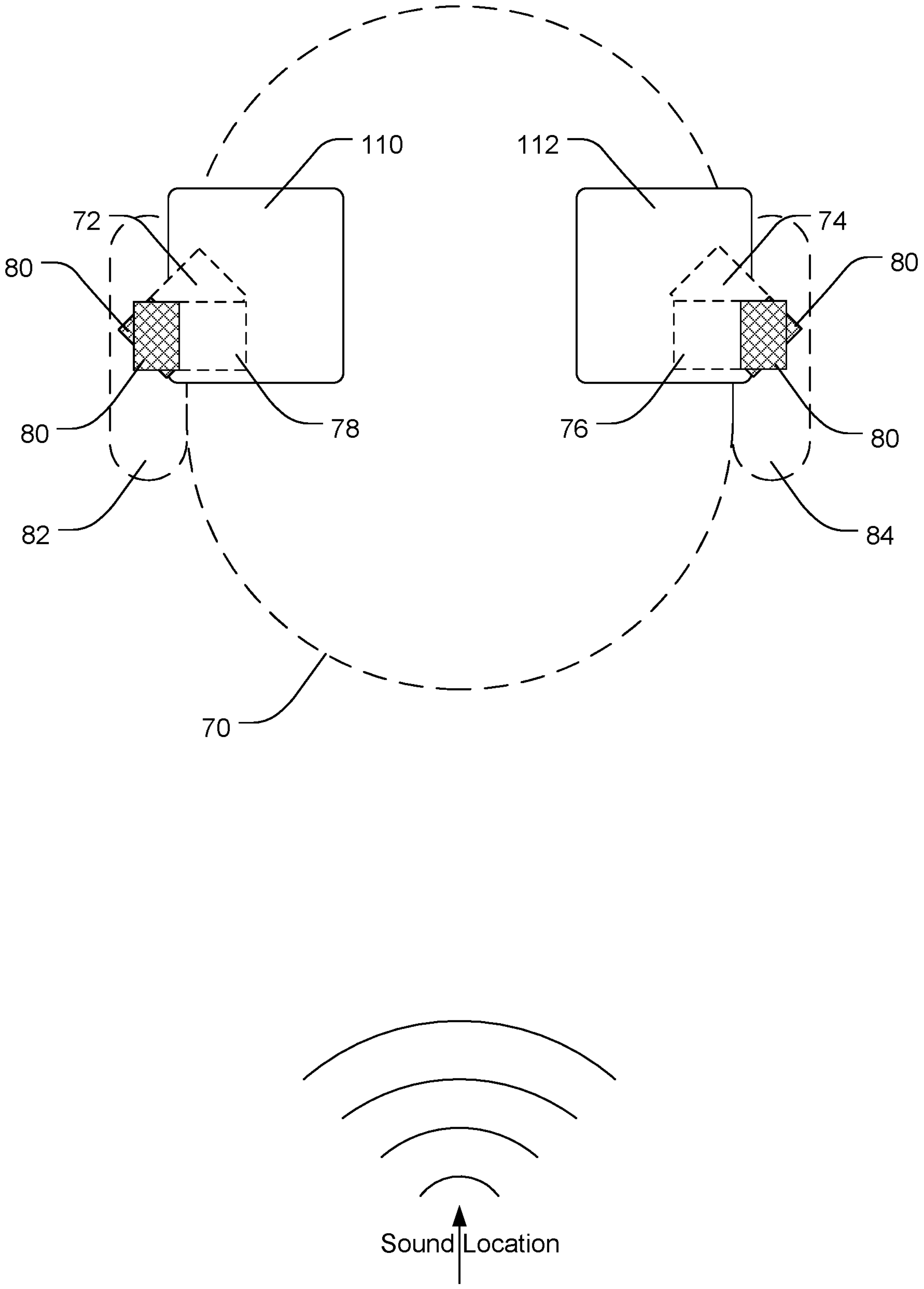
FIG. 17 shows an embodiment of an improved sound recording system.
Figure 18:
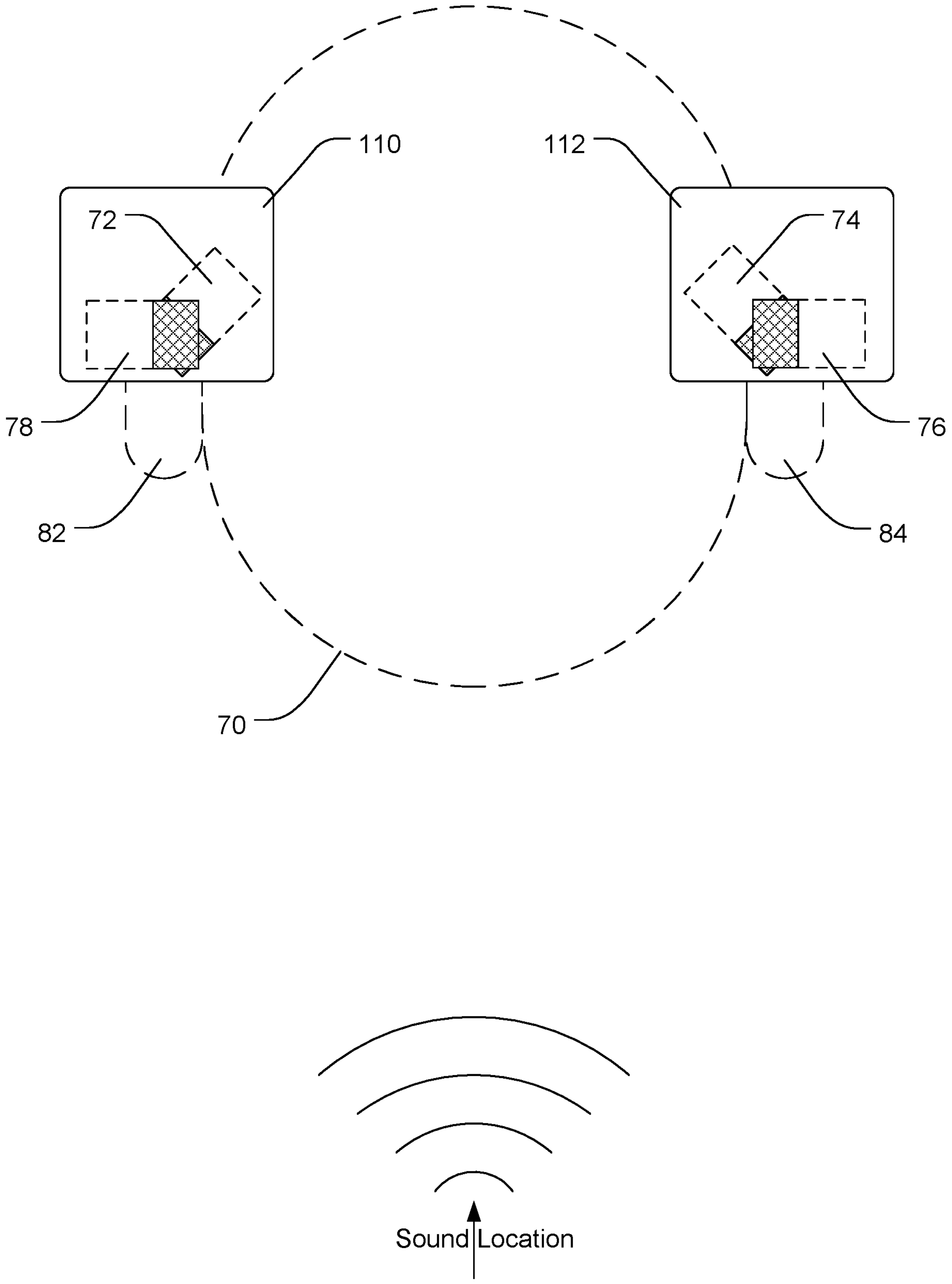
FIG. 18 shows an embodiment of an improved sound recording system.

While FIGS. 7-9 illustrate the right primary microphone 72, the left primary microphone 74, the left side-viewing microphone 76, and the right side-viewing microphone 78 as being discrete microphones having individual housings, such need not be the case. In some embodiments, the right primary microphone 72, the left primary microphone 74, the left side-viewing microphone 76, and the right side-viewing microphone 78 may all be unitarily contained within a single microphone housing 100 as a single-unit 4-channel microphone, as illustrated in FIG. 15. In fact, such a single-unit 4-channel microphone may provide certain advantages when it comes to recording in certain environments. Furthermore, such a single-unit 4-channel microphone may be incorporated into a recording unit 102 having all necessary recording equipment present, such as recording electronics 104, recording media and/or memory 106, power sources 108, and the like, as illustrated in FIG. 16. In other embodiments, two or more of the microphones form part of a single unit 110 and one or more of the other microphones is separately provided individually or as another two-microphone unit 112, as illustrated in FIGS. 17 and 18. Accordingly, embodiments of the invention are not limited to embodiments having discrete microphones such as is illustrated in FIGS. 7-9.

Figure 10:
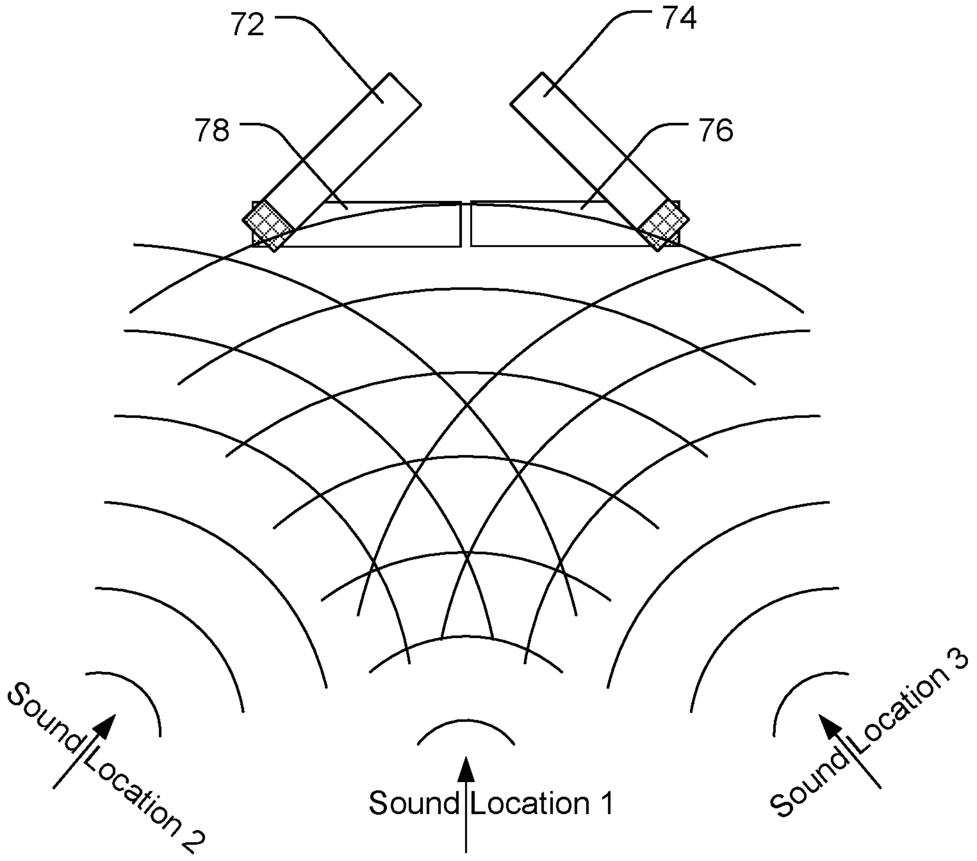
FIG. 10 shows an embodiment of an improved sound recording system being used to record sound from three locations.

FIG. 10 illustrates how sound waves emanating from three sound locations arrive at the various microphones of one embodiment of a microphone array. As may be seen from FIG. 10, sound waves emanating from a first central sound location arrive at the sound transducers 80 of right primary microphone 72, the left primary microphone 74, the right side-viewing microphone 76, and the left side-viewing microphone 78 simultaneously. In contrast, sounds from a second sound location located at the front right arrive first at the sound transducers 80 of the right primary microphone 72 and of the right side-viewing microphone 76 before arriving at the sound transducers 80 of the left primary microphone 74 and the left side-viewing microphone 78. Finally, sounds from a third sound location located at the front left arrive first at the sound transducers 80 of the left primary microphone 74 and of the left side-viewing microphone 78 before arriving at the sound transducers 80 of the right primary microphone 72 and the right side-viewing microphone 76. By maintaining recorded sounds in four channels, the original listening experience can be maintained for later listeners, such that the later listener experiences sounds as if they actually emanated from the respective sound locations shown in FIG. 10.

Figure 11:
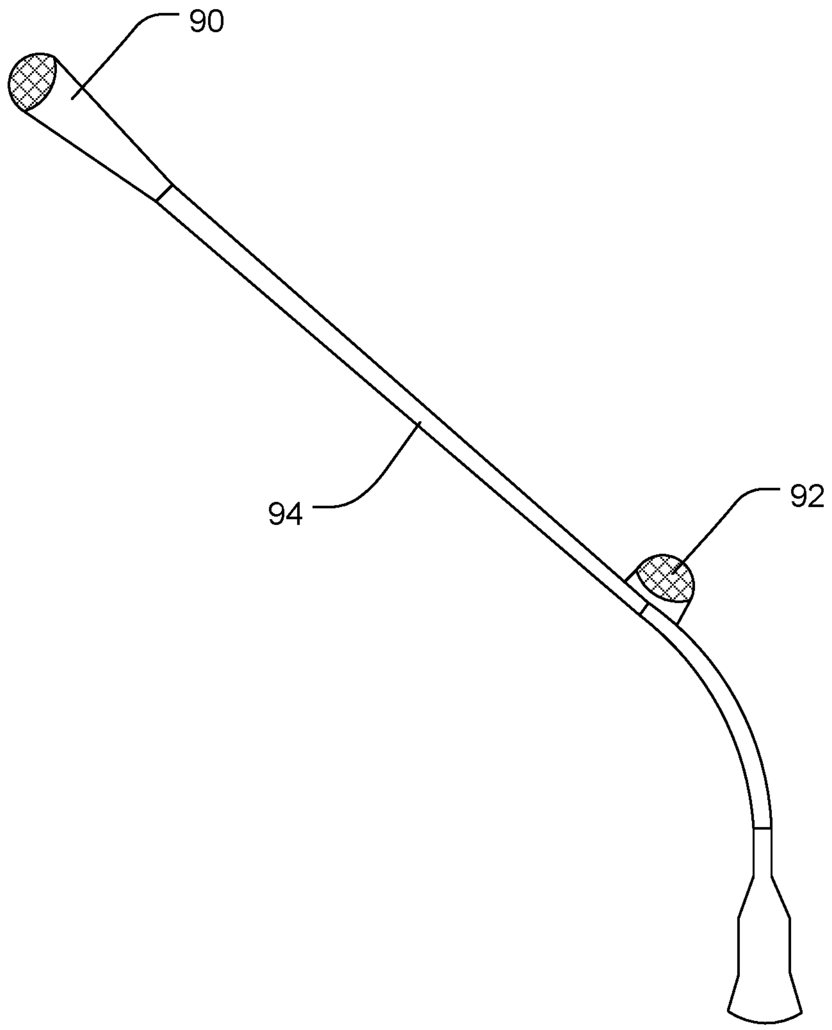
FIG. 11 shows an embodiment of an improved sound capture system in the form of a podium microphone.

Embodiments of the invention provide improved sound performance in microphone-based sound amplification or recording systems, even when enhanced localization is not a necessary goal of the systems. In particular, it has been noted that traditional podium microphones often do not sound right, particularly in the bass range, requiring studio mixing or mastering to obtain a desirable sound from the original recording. Embodiments of the invention provide improved podium microphone systems having a single channel of amplified sound (e.g., using a single XLR connector), but in which two microphones are used to obtain an improved-sounding amplified or recorded sound. In such embodiments, the microphone system includes a traditional front-facing microphone 90 that is aimed at the speaker's mouth (or singer's mouth, etc.), along with a second microphone 92 that is aimed generally perpendicularly (e.g., upward) to the direction of the speaker's direction of speaking so that the speaker is talking across the second microphone, as illustrated in FIG. 11. This second microphone 92 is spaced approximately the width of the average human head (e.g. approximately 5 to 7 inches (approximately 12-18 cm)) away from the front-facing microphone 90 down a shaft 94 or other structure of the microphone system.

In the embodiment of FIG. 11, the second microphone 92 may have filtering applied to it similar to the filtering applied to the side-viewing microphones of the systems of FIGS. 7-10. In particular, the second microphone 92 may have low-pass filtering applied to it, such as using a first-order low-pass filter contained within the microphone system. As discussed with other embodiments of the invention, the filter providing the low-pass filtering may be any type of low-pass filter of varying orders and specifications, but in some embodiments, the low-pass filter is a first-order filter having a cutoff frequency of between approximately 2.0 kHz and approximately 2.5 kHz, such as approximately 2.2 kHz. After the output of the second microphone 92 has been low-pass filtered, it can be mixed with the output of the front-facing microphone 90 and then passed as an output of the microphone system to an amplification system, recording system, or the like.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. An audio system for enhanced listener localization of played-back sound comprising:

an audio source adapted to play back an audio recording having left and right audio recorded channels;

a right main loudspeaker connected to the audio source and adapted to transduce sound corresponding to the right audio recorded channel;

a left main loudspeaker connected to the audio source and adapted to transduce sound corresponding to the left audio recorded channel;

a right side localization loudspeaker connected to the audio source and adapted to transduce sound corresponding to the left audio recorded channel after the left audio recorded channel is passed through a first low-pass filter; and a left side localization loudspeaker connected to the audio source and adapted to transduce sound corresponding to the right audio recorded channel after the right audio recorded channel is passed through a second low-pass filter, wherein the first low-pass filter and the second low-pass filter each comprise a filter having a cutoff frequency of between approximately 2.0 kHz and approximately 2.5 kHz and decrease power above the cutoff frequency at approximately 6 dB per octave.

2. The audio system as recited in claim 1, wherein the first low-pass filter is located on a physical electrical connection between the audio source and the right side localization loudspeaker, and wherein the second low-pass filter is located on a physical electrical connection between the audio source and the left side localization loudspeaker.

3. The audio system as recited in claim 1, wherein the first low-pass filter is contained within the right side localization loudspeaker, and wherein the second low-pass filter is contained within the left side localization loudspeaker.

4. The audio system as recited in claim 1, wherein at least one of the loudspeakers is connected to the audio source by a wired connection.

5. The audio system as recited in claim 1, wherein at least one of the loudspeakers is connected to the audio source by a wireless connection.

6. An audio system for enhanced listener localization of played-back sound comprising:

an audio recording comprising four channels comprising a left main audio recorded channel, a right main audio recorded channel, a left side localization audio recorded channel and a right side localization audio recorded channel;

an audio source adapted to play back the audio recording comprising four channels;

a right main loudspeaker connected to the audio source and adapted to transduce sound corresponding to the right main audio recorded channel;

a left main loudspeaker connected to the audio source and adapted to transduce sound corresponding to the left main audio recorded channel;

a right side localization loudspeaker connected to the audio source and adapted to transduce sound corresponding to the right side localization audio recorded channel; and a left side localization loudspeaker connected to the audio source and adapted to transduce sound corresponding to the left side localization audio recorded channel;

wherein the sound transduced by the right side localization loudspeaker and the left side localization loudspeaker is low-pass filtered to enhance localization by a listener, and wherein a low-pass filtering of the sound transduced by the right side localization loudspeaker and the left side localization loudspeaker is previously applied to the audio recording and stored in the left side localization audio recorded channel and the right side localization audio recorded channel.

7. The audio system as recited in claim 6, wherein the low-pass filtering of the sound transduced by the right side localization loudspeaker and the left side localization loudspeaker is applied at a time of recording the audio recording.

8. The audio system as recited in claim 6, wherein the low-pass filtering of the sound transduced by the right side localization loudspeaker and the left side localization loudspeaker is applied subsequent to a time of recording the audio recording.

9. The audio system as recited in claim 6, wherein the low-pass filtering of the sound transduced by the right side localization loudspeaker and the left side localization loudspeaker is applied by the audio source to the left side localization audio recorded channel and the right side localization audio recorded channel before the audio source drives the right side localization loudspeaker and the left side localization loudspeaker.

10. The audio system as recited in claim 6, wherein the low-pass filtering of the sound transduced by the right side localization loudspeaker and the left side localization loudspeaker is applied by low-pass filters disposed in connections between the audio source and the right side localization loudspeaker and between the audio source and the left side localization loudspeaker.

11. The audio system as recited in claim 6, wherein the low-pass filtering of the sound transduced by the right side localization loudspeaker and the left side localization loudspeaker is applied by low-pass filters disposed within the right side localization loudspeaker and the left side localization loudspeaker.

12. The audio system as recited in claim 6, wherein connections between the audio source and the loudspeakers comprise connections selected from the group consisting of:

wired connections; and wireless connections.

13. An audio system for enhanced listener localization of played-back sound comprising:

an audio source adapted to play back an audio recording having left and right audio recorded channels;

a right main loudspeaker connected to the audio source and adapted to transduce sound corresponding to the right audio recorded channel;

a left main loudspeaker connected to the audio source and adapted to transduce sound corresponding to the left audio recorded channel;

a right side localization loudspeaker connected to the audio source and adapted to transduce sound corresponding to the left audio recorded channel after the left audio recorded channel is passed through a first low-pass filter; and a left side localization loudspeaker connected to the audio source and adapted to transduce sound corresponding to the right audio recorded channel after the right audio recorded channel is passed through a second low-pass filter, wherein the first low-pass filter and the second low-pass filter are each contained within the audio source.

* * * * *